(12) United States Patent
Gareis et al.

(10) Patent No.: US 10,981,435 B2
(45) Date of Patent: Apr. 20, 2021

(54) AIR VENT HAVING A CONTROL DEVICE

(71) Applicant: DR. SCHNEIDER KUNSTSTOFFWERKE, Kronach (DE)

(72) Inventors: Jenny Gareis, Wallenfels (DE); Dominic Horner, Kronach (DE); Juergen Seemann, Kronach (DE)

(73) Assignee: DR. SCHNEIDER KUNSTSTOFFWERKE GMBH

( * ) Notice: Subject to any disclaimer, the term of this patent is extended or adjusted under 35 U.S.C. 154(b) by 636 days.

(21) Appl. No.: 15/566,187

(22) PCT Filed: May 24, 2016

(86) PCT No.: PCT/EP2016/061682
§ 371 (c)(1),
(2) Date: Oct. 12, 2017

(87) PCT Pub. No.: WO2016/188993
PCT Pub. Date: Dec. 1, 2016

(65) Prior Publication Data
US 2018/0099541 A1 Apr. 12, 2018

(30) Foreign Application Priority Data
Oct. 29, 2015 (DE) .................... 10 2015 118 548.2

(51) Int. Cl.
*B60H 1/34* (2006.01)
(52) U.S. Cl.
CPC ... *B60H 1/3421* (2013.01); *B60H 2001/3478* (2013.01)
(58) Field of Classification Search
CPC ....................... B60H 1/3421; B60H 2001/3478
See application file for complete search history.

(56) References Cited

U.S. PATENT DOCUMENTS 3,552,295 A * 1/1971 Armstrong .............. F24F 13/15
454/315
5,482,506 A * 1/1996 Tsuda .................. B29C 45/0017
454/155
(Continued)

FOREIGN PATENT DOCUMENTS

DE 19650906 A1 * 6/1997 ............. B60H 1/249
DE 29814953 12/1998 ............... B60H 1/34
(Continued)

OTHER PUBLICATIONS

Schneider, DE 20114844 U1 English machine translation of the claims, Jan. 10, 2002 (Year: 2002).*
(Continued)

*Primary Examiner* — Kenneth J Hansen
*Assistant Examiner* — Phillip Decker
(74) *Attorney, Agent, or Firm* — Hayes Soloway P.C.

(57) ABSTRACT

An air vent has at least one first control lamella that is pivotably mounted in a housing, and a second lamellae extending orthogonally to the first control lamella. For controlling the amount and direction of outflowing air, an operating element is pivotable mounted about an axis that extends parallel to the pivot axis of the second lamellae, and which is coupled to a first adjustment element and to the first control lamella. The first adjustment element has a toothed segment, which is in engagement with a first gearwheel that is rotatably mounted on the housing. The first gearwheel is in engagement with a second adjustment element that is arranged on a second control lamella of the second lamellae,
(Continued)

wherein the second control lamella is coupled with the other second lamellae by way of at least one connection rod, and the second gearwheel is of spring-mounted design.

20 Claims, 14 Drawing Sheets

(56) References Cited

U.S. PATENT DOCUMENTS

| | | | | |
|---|---|---|---|---|
| 5,741,179 | A * | 4/1998 | Sun | B60H 1/3414 |
| | | | | 454/155 |
| 5,766,070 | A * | 6/1998 | Schwarz | B60H 1/3421 |
| | | | | 454/155 |
| 6,074,295 | A * | 6/2000 | Volk | B60H 1/34 |
| | | | | 454/152 |
| 6,533,655 | B2 * | 3/2003 | Demerath | B60H 1/3421 |
| | | | | 454/155 |
| 7,575,510 | B2 * | 8/2009 | Kim | B60H 1/3428 |
| | | | | 454/155 |
| 9,110,492 | B2 * | 8/2015 | Puskar, Jr. | G05G 1/10 |
| 9,579,954 | B2 * | 2/2017 | Kim | B60H 1/3421 |
| 10,406,891 | B2 * | 9/2019 | Gareis | B60H 1/3421 |
| 10,625,575 | B2 * | 4/2020 | Lee | B60H 1/3421 |
| 2006/0157618 | A1 * | 7/2006 | Lee | B60H 1/3421 |
| | | | | 244/99.2 |
| 2007/0111653 | A1 * | 5/2007 | Endou | B60H 1/3421 |
| | | | | 454/155 |
| 2014/0364045 | A1 * | 12/2014 | Noichl | F24F 13/1426 |
| | | | | 454/155 |
| 2019/0375266 | A1 * | 12/2019 | Belzons | B60H 1/3414 |

FOREIGN PATENT DOCUMENTS

| | | | | |
|---|---|---|---|---|
| DE | 20114844 | U1 * | 1/2002 | |
| DE | 202012100243 | | 5/2012 | B60H 1/34 |
| DE | 202012100980 | | 7/2012 | B60H 1/34 |
| DE | 102011050435 | | 11/2012 | B60H 1/34 |
| DE | 102013100534 | | 7/2013 | B60H 1/34 |
| DE | 102014200544 | A1 * | 7/2014 | F24F 13/075 |
| EP | 1712384 | | 10/2006 | B60H 1/34 |
| EP | 2463130 | A1 * | 6/2012 | B60H 1/3428 |
| JP | 2001121957 | A * | 5/2001 | |
| KR | 20040108178 | A * | 12/2004 | |

OTHER PUBLICATIONS

Ito, JP 2001-12957 A English machine translation, Aug. 5, 2001 (Year: 2001).*

German Office Action (w/machine translation) issued in application No. 10 2015 118 548.2, dated Dec. 14, 2016 (4 pgs).

International Search Report (w/translation) and Written Opinion (no translation) issued in application No. PCT/EP2016/061682, dated Sep. 5, 2016 (10 pgs).

International Preliminary Report on Patentability (w/translation) issued in application No. PCT/EP2016/061682, dated Dec. 7, 2017 (14 pgs).

* cited by examiner

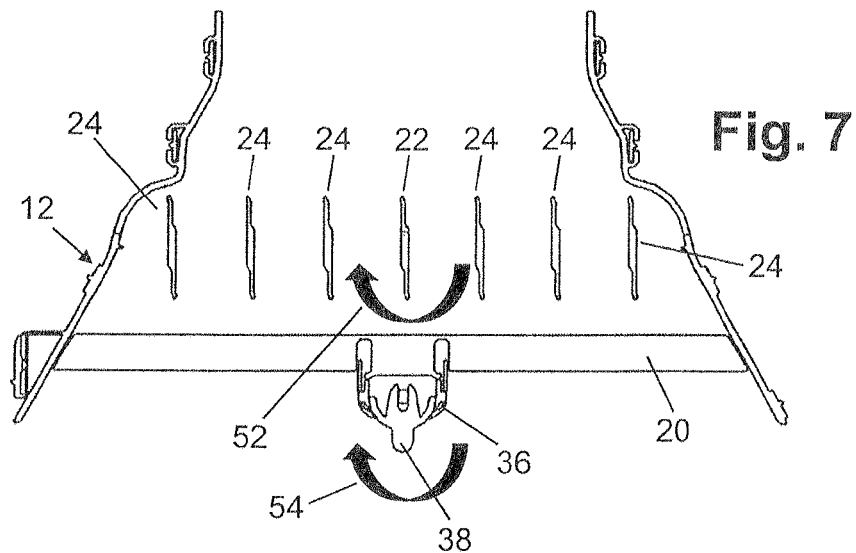
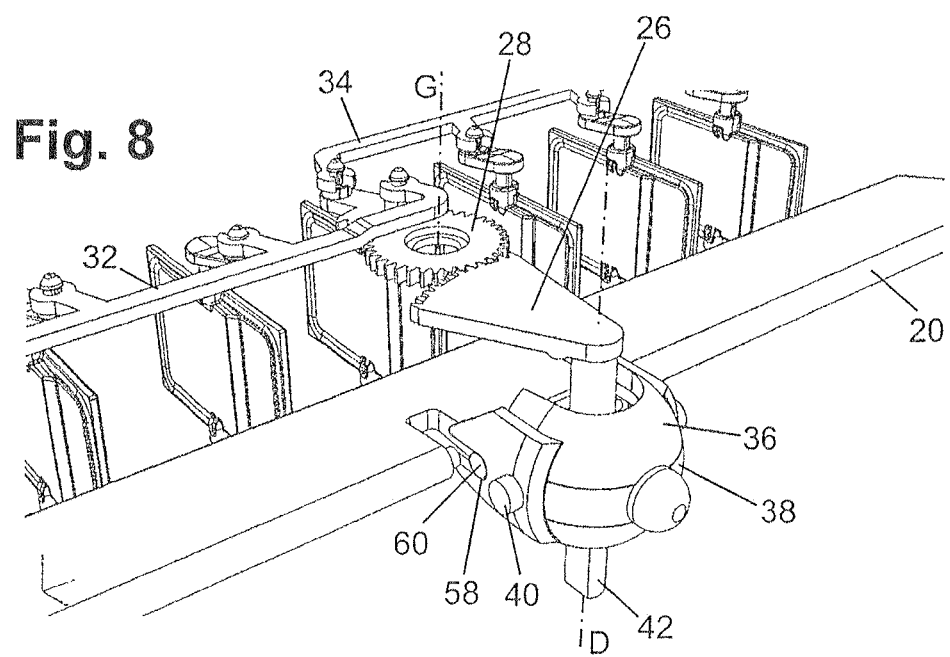

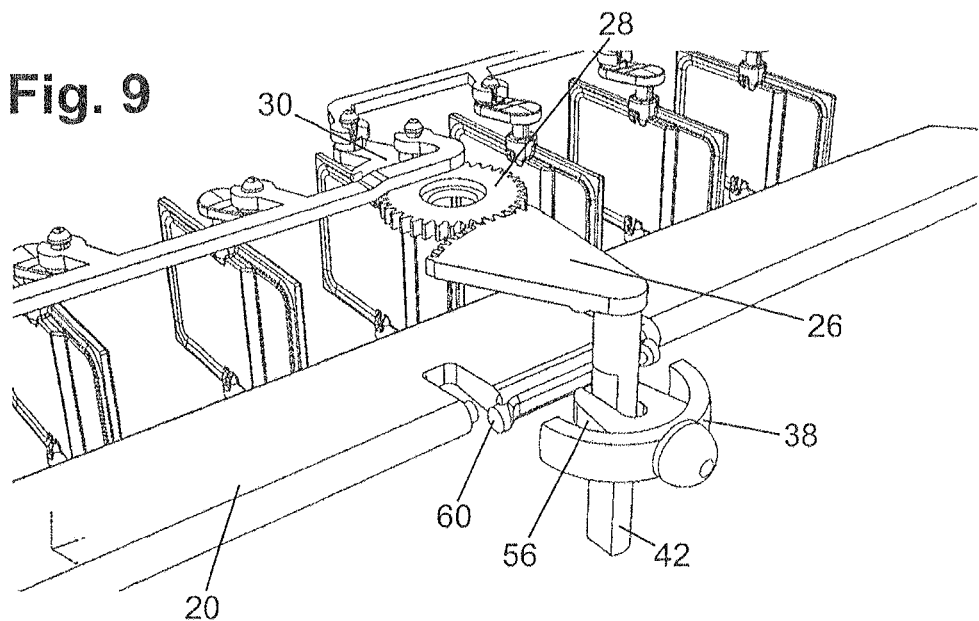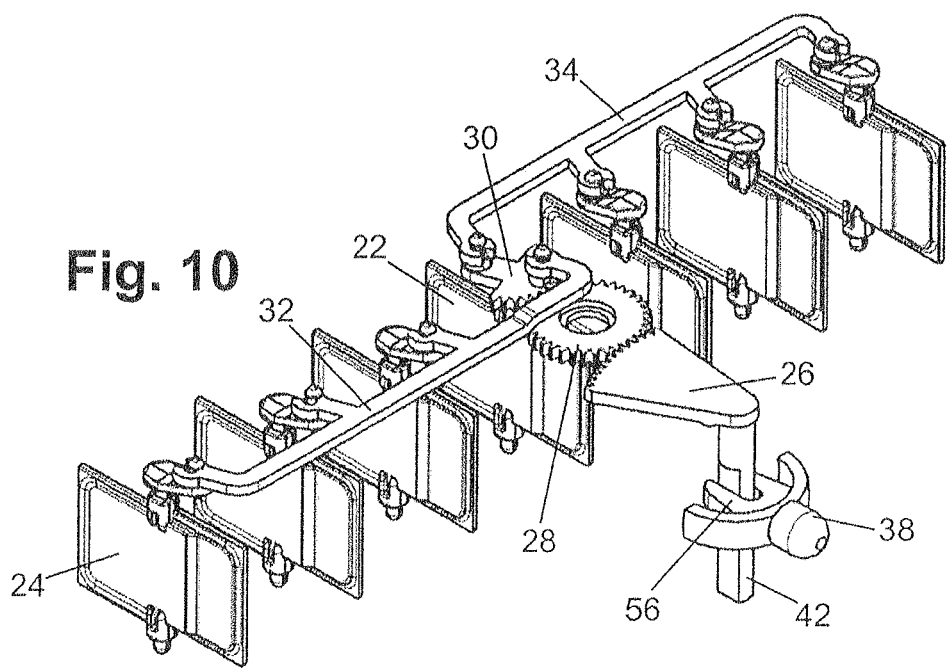

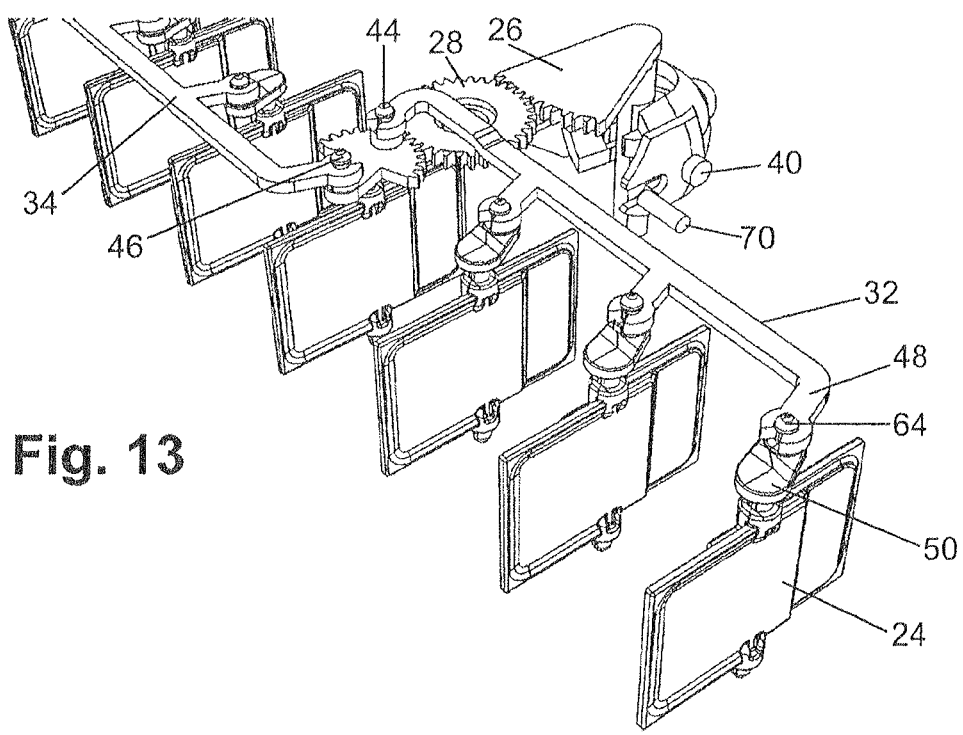
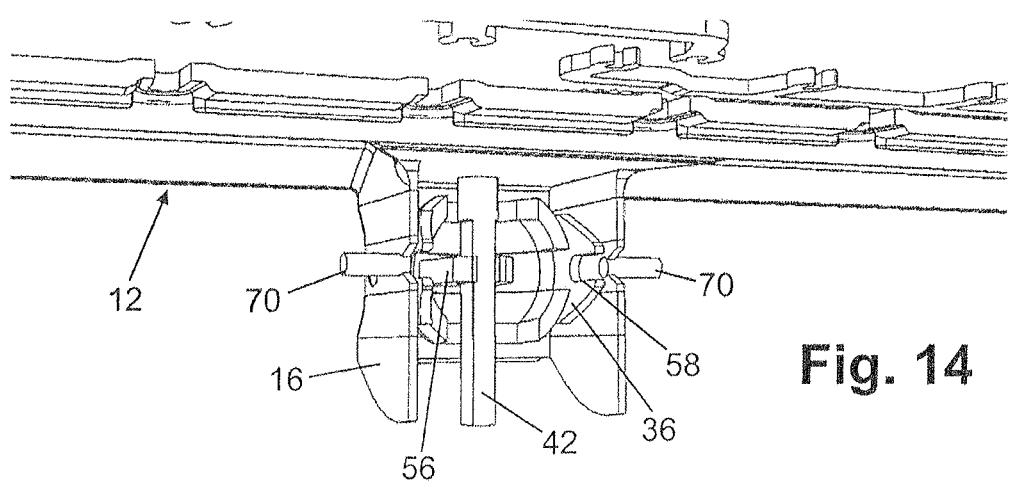

AIR VENT HAVING A CONTROL DEVICE

BACKGROUND OF THE INVENTION

An air vent with a control device for controlling the direction and the amount of air flowing out of an air vent is described. In particular, an air vent with a control device constructed as a so-called one-knob control is described. The air vent has at least one control slat, which is pivotably mounted in a housing, and second slats extending orthogonally to the control slat and pivotably mounted in the housing, wherein the direction of the air flow exiting the housing is settable by way of the control slat and the second slats and in addition the amount of outflowing air is settable by way of the second slats.

Various devices for controlling an air flow are known from the prior art, in which both the direction of the outflowing air and the amount of the outflowing air are settable by way of vertical slats arranged behind a control slat.

DE 10 2013 100 534 A1 discloses a device for controlling an air flow, wherein a front horizontal slat constructed as a control slat has a mount in which a circular control element is mounted. A change in the orientation of vertical slats can be effected by way of the control element by a rotational movement. The vertical slats can be pivoted by way of the control element to such an extent that they prevent the air flow through the air vent.

A device for controlling an air flow is disclosed in DE 20 2012 100 980 U1. The device comprises at least one first control slat, and second slats mounted orthogonally to the first control slat. Also present is a control element, by means of which the orientation of the at least one first slat and of the second slats is made possible.

DE 298 14 953 U1 discloses a fresh-air nozzle device for a motor vehicle, in which control of the quantity of outflowing air is similarly settable by way of the vertical slats. Adjusting devices arranged outside the housing and in the form of control wheels are provided for swivelling or pivoting or pivotation of the slats.

However, the devices known from the prior art have the disadvantage that only an inadequate closure of the air feed shaft is possible by way of the rear vertical slats. In particular, in the case of devices for control of an air flow with control elements arranged in the region of the slats it is not possible to transmit to the rear vertical slats by way of the control element a sufficient force to make a sealed closure possible. In addition, the devices known from the prior art with substantially centrally arranged control elements have the disadvantage that these comprise a plurality of components which intrude into the flow channel of the air vent and thus produce an additional, but undesired, deflection of the air. A sealed closure is therefore often not possible in the prior art, notwithstanding sealing means, since the components of the air vents have dimensional differences (tolerances) and in the case of repeated actuation the play of the components further increases.

It is therefore the object to indicate a device for controlling an air flow, which eliminates the disadvantages of the prior art and provides an economic, simple and reliable control of the air outflow direction and the amount of outflowing air.

SUMMARY OF THE INVENTION

In the case of an air vent, which fulfils the aforesaid object, with a device for controlling an air flow, comprising at least one first control slat pivotably mounted in a housing and second slats extending orthogonally to the first control slat and pivotably mounted in the housing, the direction of the air flow exiting the housing being settable by way of the first control slat and the second slats and the amount of outflowing air being settable by way of the second slats, and a control element arranged in an air outlet region of the housing:

the control element is mounted to be pivotable about an axis extending parallel to the pivot axis of the second slats and is coupled with a first adjusting element and with the first control slat, the first adjusting element has a toothed segment disposed in engagement with a first gearwheel rotatably mounted at the housing, the first gearwheel is disposed in engagement with a second adjusting element arranged at a second control slat of the second slats, the second control slat is coupled with the other second slats by way of at least one connecting rod and the first gearwheel is of sprung construction.

The air vent can be arranged in, for example, a dashboard or another location in a motor vehicle. The air vent can be supplied with fresh air or air from an air-conditioning installation by way of air channels, in which case how much and in which direction the supplied air flows out of the air outlet region are controlled by way of the control element. In the case of the air vent described herein a separate closure flap is not provided, but the air flow is partly or completely interrupted by way of the second slats. If a vent is closed by way of the rear slats rather than by way of a closure flap, then with the vents known from the prior art the slats, which are drawn by an entrainer, do not completely seal. The tolerances in the components are on occasion also responsible for that. Due to the sprung construction of the first gearwheel and the sprung construction of the coupling rod the second slats can be brought by means of pressure into the end position thereof in which an air channel of the air vent is closed, so that a sealed closure of an air channel extending through the housing of the air vent is achieved. The sprung form of the first gearwheel and of the coupling rod makes compensation for tolerances possible. As a result, a significantly improved sealing is achieved, so that there are substantially no leakage air flows, i.e. the air channel in the housing is completely closed.

A sprung gearwheel makes it possible to store energy and in addition to exert a pressure on the second slats in the end position thereof so that these remain in their sealing closed setting even when a control force is no longer applied by way of the control element. Moreover, the sprung form of the first gearwheel compensates for tolerances of the individual components of the air vent. Thus, even in the case of differences in the sizes of the individual components a complete closure of the air channel can be achieved by the second slats, since the at least one connecting rod can, by virtue of the sprung form, be displaced further than would be possible without springing. The production costs of the air vent can thereby be significantly reduced.

The control element is arranged at the front side of the air vent and can have a knob which for controlling the air vent pivots, by up/down movement, the first control slat and, by pivotation in a direction extending orthogonally to the up/down movement, causes swivelling or pivoting or pivotation of the second slats.

The first control slat can be a vertically extending slat or a horizontally extending slat. The arrangement of the device and the individual components in horizontal or vertical direction can be as desired. The air vent can have a significantly greater width or height than height or width. Such air vents are also termed wide-band vents, in which the length of the first control slat lies, for example, in a range between 100 millimetres and 400 millimetres.

In further forms of embodiment the control element comprises a first control part and a second control part, wherein the first control part is mounted on a mounting web to be pivotable about a first axis extending parallel to the longitudinal axis of the first control slat and the second control part is mounted in the first control part to be pivotable about a second axis extending orthogonally to the first axis. In this embodiment, the essential components for swivelling or pivoting or pivotation of the slats are arranged in the region of the mounting web and not at the first control slat. This, on the one hand, does not cause any deflection of the air flow by components at the first control slat and additionally also prevents warping of the first control slat, since no pressure is applied to the first control slat by way of control elements. The first control part is supported on the mounting web and can be pivoted about the first axis. If the first control part is pivoted about the first axis, a swivelling or pivoting or pivotation of the first control slat takes place. The second control part is mounted within the first control part to be rotatable about the second axis orthogonally to the first axis and enables swivelling or pivoting or pivotation of the second slat. In that case, a so-called one-knob control is provided, in which three functions are provided by way of two motion sequences. On the one hand it is possible to change an air flow, for example upwardly or downwardly, by swivelling or pivoting or pivotation of the first control slat and to realise a lateral swivelling or pivoting or pivotation of the second slats by way of swivelling or pivoting or pivotation of the second control part. If the second slats are swivelled by way of the second control part into their end position then the second slats completely close the air channel through the housing. In this embodiment it is possible to dispense with additional means for stiffening or supporting the first control slat. In particular, this embodiment is advantageous in the case of very wide air vents (wide-band vents) since warping of a very lengthy first control slat is prevented.

In the afore-mentioned embodiment the first adjusting element can have a section, which extends orthogonally to the toothed segment and along the second axis, about which the first adjusting element is rotatably mounted in the housing and which is surrounded by a first control section of the second control part. The swivelling or pivoting or pivotation of the second control part is translated into a rotational movement of the first adjusting element. The swivelling or pivoting or pivotation of the first adjusting element causes turning or rotating or rotation of the first gearwheel and thus turning or rotating or rotation of the second adjusting element.

Moreover, in the afore-mentioned embodiments the second adjusting element can have at least one toothed segment section and two opposite coupling elements arranged eccentrically with respect to the pivot axis of the second control slat, wherein the coupling elements are each connected with a coupling rod and the coupling rods are each connected with a respective group of second slats. By virtue of the eccentric arrangement of the coupling elements the rotational movement of the second adjusting element is translated into a substantially longitudinal movement of the coupling rods. However, the coupling rods can in that case execute a certain degree of compensatory movement orthogonally to the displacing movement. By virtue of the eccentric arrangement of the coupling elements at the second adjusting element not only are the coupling rods displaced, but also the second slats are always brought by means of pressure into the end position thereof for closing the air channel of the housing.

In a further construction of the afore-mentioned variants the coupling rods can have cranked sections by way of which the coupling rods are connected with the second slats. By this means, pressing of the second slats into the end position thereof is further improved. In addition, the cranked sections can serve as springing when bringing the second slats into the end position thereof. If, for example, the second slats are brought with a high level of pressure into their end position then compensation for excessive pressure, which could lead to destruction of the coupling rods, can be provided by way of the cranked sections. In addition, the movement energy for displacing the second slats can be stored in the cranked sections so that the pressure on the second slats in the end positions thereof continues to be maintained.

Advantageously, the important components such as, for example, the first gearwheel, the first adjusting element and the second adjusting element are arranged outside the housing, i.e. not in the air channel of the air vent, so that creation of turbulence by components for swivelling or pivoting or pivotation of slats is prevented. Moreover, through translation of the pivot movement of the second control part into a rotational movement a more precise possibility of adjustment of the second slats as well as a higher level of pressure on the second slats for swivelling or pivoting or pivotation arise. The pressure on the slats can be determined by the translation between the toothed segments and the gearwheel as well as by the spacing of the coupling elements, which are arranged eccentrically at the second adjusting element, from the axis of rotation of the second adjusting element. The afore-described embodiments in that case have a very simple construction and make possible, in reliable mode and manner, fulfilment of three control functions, namely orientation of an air flow not only in a vertical direction, but also in a horizontal direction, and control of the amount of exiting air. Moreover, in the case of the embodiments described herein it is possible to provide compensation for tolerances of the individual components. Compensation for tolerances is achieved especially by the sprung configuration of the first gearwheel and also by the sprung execution of the coupling rods by way of the cranked sections. In addition, a movement transmission in a very small installation space is achieved. This has a particularly positive effect on the installation space needed for installating the air vent and also on the costs for the air vent as well as the weight of the air vent.

In further alternative forms of embodiment with respect to the afore-described air vents the control element can have a first control part and a second control part, wherein the first control part is mounted in the second control part to be pivotable about a first axis extending parallel to the longitudinal axis of the first control slat and the second control part is mounted on the housing to be pivotable about a second axis extending orthogonally to the first axis. In the case of these embodiments as well, warping of the first control slat is prevented since no pressure is exerted on the first control slat by way of the control parts. Merely an operating force for swivelling or pivoting or pivotation of the first control slat is applied by way of the first control part. Since the first control slat is supported on the housing by way of the first control part and the mounting thereof within the second control part, there is no warping. Accordingly, the construction of the air vent can be used even for so-called wide-band vents in which the first control slat has a length of more than 150 millimetres. Analogously to the afore-described variants, swivelling or pivoting or pivotation of the first control slat takes place by swivelling or pivoting or pivotation of the first control part about the first axis and swivelling or pivoting or pivotation of the second slats takes place by turning or rotating the second control part about the second axis. For that purpose, for example, a control knob fixedly connected with the first control part is pressed in the direction in which the second slats are to be swivelled. If the control button is pressed over a certain extent in a direction corresponding with the end position of the second slats then closure of the air channel of the air vent by way of these second slats takes place.

In the case of the afore-mentioned embodiment the first control part can be pivotably mounted by way of a spring in a receptacle in the second control part. The spring can preferably be constructed as a metal spring. The spring ensures that a specific minimum degree of force (operating force) has to be applied in order to produce swivelling or pivoting or pivotation of the first control slat. Without such a spring the swivelling or pivoting or pivotation of the first control slat would take place in too light a motion and could be executed unintentionally. In addition, it is frequently difficult to find a precise position for the first control slat if the swivelling or pivoting is possible with too light a motion. The spring in the receptacle of the second control part exerts pressure on the first control part or a region or an element of the first control part so that the spring force has to be overcome for swivelling or pivoting the first control part. It is thereby possible to also undertake very fine adjustments. As an alternative to a spring, an appropriate coating in the receptacle or on the first control part could also be provided so that the friction between the first control part and the receptacle in the second control part slows down the swivelling or pivoting of the first control part.

In further variants of the afore-described embodiment the first adjusting element can be connected with the second control part and the first control part comprises a second control section, which is coupled with the first control slat. The second control section can in that case engage around a control shaft or a corresponding section of the first control slat. If the first control part is swivelled, then this produces swivelling or pivoting of the first control slat in the opposite sense. In that case, by way of the second control section the first control part engages a region or the control shaft of the first control slat, which does not run through the pivot axis of the first control slat.

In further variants of the afore-described forms of embodiment the second adjusting element is a second gearwheel which is connected with the second control slat and is in engagement with the first gearwheel, wherein the second slats are each connected with a respective third gearwheel, the axis of rotation of which is the pivot axis of the second slats, and wherein the third gearwheels are coupled with the second gearwheel by way of a rack. If, for example, the second control part is swivelled by pressing the first control part then swivelling or pivoting of the first adjusting element, and thus turning or rotating of the first gearwheel, take place by way of the connection of the first adjusting element with the second control part. The first gearwheel meshes with the second gearwheel, so that the second control slat is correspondingly rotated. The pivot axis of the second control slat in that case equally corresponds with the axis of rotation of the second gearwheel. The second gearwheel has, for example, a height which is greater than the height of the first gearwheel. The second gearwheel can then mesh not only with the first gearwheel, but also with a gearwheel section of the rack in the same section. If the second gearwheel is now rotated, then a displacement of the rack takes place, in which case the teeth of the rack mesh with the third gearwheels at the second slats. A corresponding swivelling or pivoting of the second slats takes place by way of that. However, the rack can also be arranged at a side opposite the first gearwheel and be disposed in engagement with the second gearwheel and the third gearwheels. Cutouts in the rack produce a resilient effect to compensate for tolerances. Torque is transferred directly to the bearing axis of the slats instead of by way of a lever. Only one rack is needed by comparison with two coupling rods.

The first control part is pivotably mounted in a receptacle of the second control part, in which case the receptacle can have detent elements. Depending on the number of detent elements, different settings of the first control slat can thus be predetermined and are perceptible by touch. If the second control part is now swivelled by lateral pressing against the first control part then the detent elements prevent the first control part from slipping, i.e. from being unintentionally pivoted. In the case of turning or rotating or swivelling or pivoting of the second control part a section, which is mounted in the receptacle of the second control part, of the first control part always presses against a side wall of the receptacle.

In further variants of the afore-described embodiments the rack is a sprung rack and mounted on the housing by way of guide elements. In the case of a sprung rack, energy can be stored analogously to a coupling rod with cranked sections. A sprung rack makes it possible, analogously to the first gearwheel of sprung configuration, to store energy and to continue to exert pressure on the second slats in the end position thereof, so that these remain in their sealing closed setting even when a control force is no longer applied by way of the control element. In order that the control element is not automatically moved back due to the high pressure stored in the sprung rack and, for example, also the sprung gearwheel, the second control part can be mounted, for example by way of a clip or a spring, on the housing in a corresponding opening. For turning or rotating or for swivelling or pivoting the second control part a specific minimum operating force then has to be applied analogously to the spring for the first control part. In that case the spring force prevents return movement without an operating force introduced from outside by a user. Moreover, the sprung construction of the rack provides compensation for tolerances of the individual components of the air vent. Thus, even in the case of differences in the masses of the individual components a complete closure of the air channel can be provided by the second slats, since the possible displacement travel of the rack due to the sprung construction is greater than the actually required displacement travel. Production costs for the air vent can thereby be significantly reduced. In analogous manner, compensation can be provided for tolerances by the sprung construction of the coupling rods due to the cranked sections.

In further variants of all afore-described embodiments the second slats can have a cross-section with at least one step, the second slats can have a seal at least at the outer edges thereof extending parallel to the pivot axis and/or the housing can have a sealing arrangement in the region of the second slats at inner side walls.

The problem with closing by one-knob slats is leakage air which arises due to gaps and tolerances. In order to keep the leakage air as small as possible, in addition to the second slats mounted orthogonally to the first control slat a sealing contour can be formed at the housing for the air vent. A cascade-shaped construction of the second slats reduces the gaps and also provides compensation for tolerances. A cascade shape is in that case achieved by the stepping of the second slats. The second slats and thus also the second control slat have, in forms of embodiment of that kind, at least two area sections arranged offset relative to one another. If the second slats are disposed in the closed setting (end position) thereof in order to close off the air channel and preclude the air feed, the flat sections, which are arranged to be offset, of the second slats bear against one another. The second slats can also be constructed so that these each have a step only in the contact regions. The contact regions are the sections of the second slats at which these in the closed setting contact adjacent second slats or bear against corresponding contact projections in the housing of the air vent.

The second slats can have a seal at least at the outer edges thereof extending parallel to the pivot axis and the housing can have in the region of the second slats a seal at least around inner side walls extending parallel to the pivot axis of the second slats. However, the seal at the second slats and in the housing can also be provided in encircling form. The seal additionally improves sealing of a closed position of the second slats (end position). The sealing means should preferably be selected so as to be flexible and resilient. By that means it is ensured that the sealing elements bear against the second slats and do not obstruct swivelling or pivoting thereof. Plastics material foams or caoutchouc elements/ caoutchouc foams or foams of rubber or foams of/with rubber constituents or elements of rubber can preferably be used for that purpose.

In further forms of embodiment the first control slat can be coupled with at least one further pivotable slat which is mounted in the housing and is pivotable parallel to the first control slat.

In the case of devices with a low height often only one control slat is required. If, however, the air vent has a greater height, then several slats arranged parallel to the first control slat can be provided. The slats arranged parallel to the first control slat are in that case preferably coupled with the first control slat outside the housing by way of appropriate entrainer elements and a further coupling rod.

In the afore-described variants a second pivot movement was realised additionally to a first pivot movement, since in the case of so-called joysticks as control elements the displacing travels are usually very limited and in this instance the closing function is also to be performed by way of the joystick. The first control slat is therefore pivoted in opposite sense to the first control part.

In the first variant of embodiment use was made of, in particular, two coupling rods instead of one coupling rod in order to realise closing by pressure for all second slats and these were so arranged that each second slat is moved into the end position by pressure by way of the coupling rods.

Due to the fact that the important kinematic components such as the first adjusting element, first gearwheel and second adjusting element are arranged outside the housing of the air vent, cross-section losses as known from the prior art are avoided. In addition, in the air vents known from the prior art the essential kinematic components are often visible, which detracts from the visual appearance of air vents of that kind. The just-described air vents solve this problem, since the important components such as, for example, the two adjusting elements and the first gearwheel are arranged outside the housing. Moreover, there is the further advantage in the case of the afore-described air vents that cut-outs are not necessary in one of the slats, for example the second slats. Thus, for example, DE 10 2013 100 534 A1 discloses the possibility of bringing the vertical slat into a closed position, but in all forms of embodiment at least one slat is provided with a large-area cut-out which inadequately fulfils air deflection and moreover produces additional turbulence in an air flow. Such cut-outs are as a rule primarily required in vertical slats in air vents of the prior art because the control element of these air vents needs a point of engagement with the vertical slats.

Lighting elements such as light-emitting diodes, optical conductors or other means can also be provided in the air vents. For example, a light source can be arranged in the region of the mounting web and provides illumination of the first control slat, the second slats or parts of the housing by way of optical conductors.

Further advantages, features and possibilities of embodiment are evident from the following figure description of embodiments, which are not to be understood as limiting.

In the drawings:

BRIEF DESCRIPTION OF INVENTION

FIGS. 6 and 7 show a schematic plan view of components of the air vent of FIG. 1;

FIGS. 8 to 10 show further perspective illustrations of components of the air vent of FIG. 1;

FIGS. 13 to 15 show still further perspective illustrations of components of the air vent of FIG. 1;

DETAILED DESCRIPTION OF THE INVENTION

Figure 1:
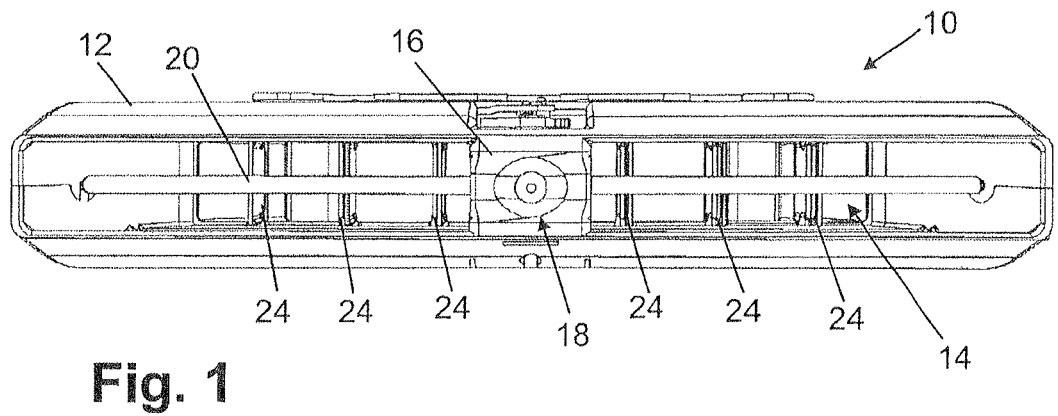
FIG. 1 shows a schematic front view of an air vent of a first form of embodiment.
Figure 2:
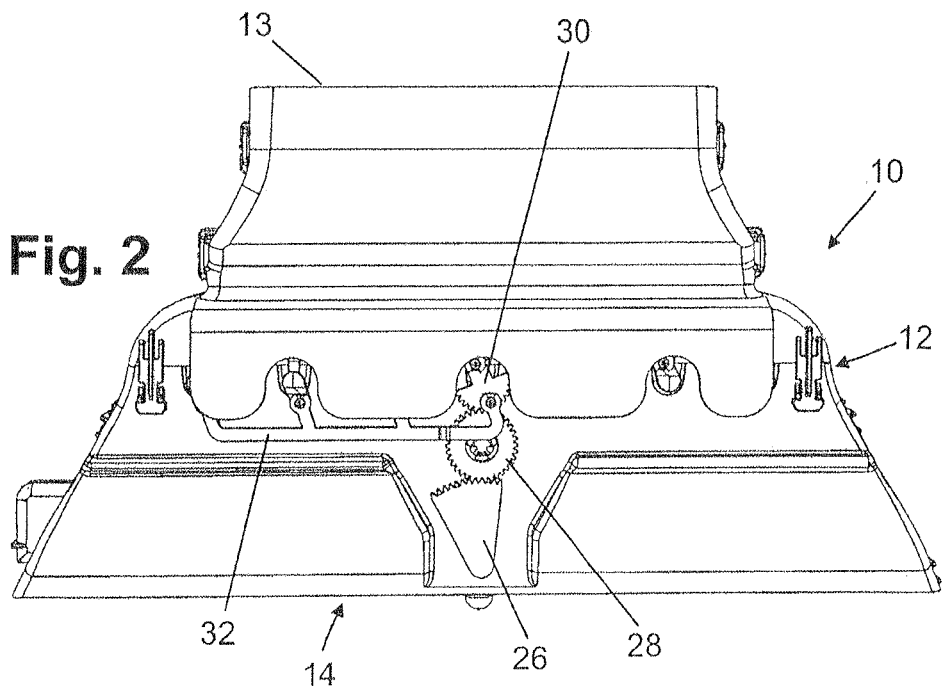
FIG. 2 shows a schematic plan view of the air vent of FIG. 1.

Parts provided in the figures with the same reference symbols substantially correspond with one another insofar as nothing to the contrary is indicated. Moreover, description of components, which are not essential for understanding of the technical teaching disclosed herein, of the air vent 10 for controlling an air flow has been dispensed with.

The air vents 10 as well as components shown in FIGS. 1 to 30 can be arranged in, for example, the region of a centre console of a vehicle dashboard. The air vents are in that case constructed as so-called wide-band vents. This means that the air vents 10 have a greater width than height in an air outlet region 14. The air exhaust region 14 preferably has a width of more than 200 millimetres, preferably a width of more than 300 millimetres.

In the following description the terms "rotating" and "pivoting" are on occasion used as synonyms. Thus, for example, pivotable slats are also rotatable about the pivot axes thereof and a rotatably mounted control element can be pivoted about its axis of rotation.

First Form of Embodiment

A first form of embodiment of an air vent 10 is shown in FIGS. 1 to 16 and described in the following with reference to FIGS. 1 to 16.

The air vent 10 comprises a housing 12. The housing 12 has at the front side thereof an opening which defines the air outlet region 14. A mounting web 16 is arranged in the air outlet region 14 and extends substantially centrally through the air outlet region 14. A control element 18 is arranged at the mounting web 16. The control element 18 serves the purpose of pivoting a substantially horizontally extending first control slat 20 and—by way of a first adjusting element 26, a first gearwheel 28 and a second adjusting element 30—second slats 24 so as to correspondingly deflect the air exiting by way of the air outlet region 14. In addition, the amount of air flowing out via the air outlet region 14 can be set by way of the control element 18, for which purpose the second slats 24 are moved into the closed position thereof.

The housing 12 has a connection 13 with an air supply channel at its rear side. The air supply channel can be coupled with, for example, an air-conditioning installation so that conditioned air can flow out of the air vent 10 via the air outlet region 14.

The control element 18 consists of a first control part 36 and a second control part 38. If the first control part 36 is pivoted in the mounting web 16 about a first axis C (see FIG. 4) by pressure on the control knob at the second control part 38 then swivelling or pivoting of the first control slat 20 about the longitudinal axis B thereof in opposite sense takes place. The longitudinal axis B extends through bearing pins 19, by way of which the first control slat 20 is mounted in the housing 12. The first control slat 20 additionally has bearing pins 70 which extend along the longitudinal axis B and are pivotably mounted in mounts in the mounting web 16. If the first control part 36 is pivoted downwardly about the first axis C by way of pressure on the second control part 38 from above then swivelling or pivoting of the first control slat 20 takes place in opposite sense in such a way that an air flow exiting by way of the air outlet section 14 is deflected upwardly. If the second control part 38, which is mounted in an opening 66 of the first control part 36 to be pivotable about a second axis D, is pivoted to, for example, the right or left then an analogous swivelling or pivoting of the second slats 24 takes place in a corresponding manner. If the second control part 38 is pivoted out beyond a specific range then the second slats 24 are brought into the end position or closed position thereof, in which case the air channel through the housing 12 of the air vent 10 is completely closed.

For transmission of the pivot movement of the second control part 38 to the second slats 24, the first adjusting element 26 is rotatably arranged by way of a section 42 in a corresponding opening in the housing 12. The section 42 extends along the second axis D. The first adjusting element 26 is coupled with the second control part 38 and, when swivelling or pivoting of the second control part 38 takes place, is pivoted in corresponding manner. The first gearwheel 28, which is mounted on the housing 12 of the air vent 10 to be rotatable about an axis G, is rotated by way of the toothed section of the first adjusting element 26 (see FIG. 8). The first gearwheel 28 is of sprung construction and, for example, constructed like the gearwheel 82 of the air vent 10 of the second form of embodiment (see FIG. 23). As a result, compensation for tolerances can be provided and it is ensured that the second slats 24 are brought into the closed position thereof. In their closed position, the second slats 24 and the second control slat 22 bear against one another at the edges thereof or at contact surfaces.

The first gearwheel 28 is engaged with the second adjusting element 30. The second adjusting element 30 is mounted to be rotatable about the pivot axis A of a second control slat 22 (see FIG. 4). In that case, the pivot axis A of the second control slat 22 forms the axis of rotation of the second adjusting element 30, the second adjusting element 30 being fixedly connected with the second control slat 22. If the first gearwheel 28 is rotated, then turning or rotating in corresponding manner and thus corresponding swivelling or pivoting of the second control slat 22 takes place by way of the toothed segment section. The second adjusting element 30 additionally comprises coupling elements 44 and 46 arranged eccentrically with respect to the pivot axis A. The coupling element 44 is connected with a first coupling rod 32 and the second coupling element 46 with a second coupling rod 34. The coupling rods 32 and 34 transmit the pivot movement of the second control slat 22 to the further second slats 24.

The second slats 24 are pivotably arranged in the housing 12 of the air vent 10 by way of bearing pins. The second slats 24 and the second control slat 22 can be rotated about the pivot axes A thereof. The second slats 24 have, in addition, a coupling projection 50 by way of which the second slats 24 are connected with the coupling rods 32 and 34 via further coupling elements in the form of coupling pins 64 (see FIG. 11). The coupling pins 64 are for that purpose rotatably mounted in openings 62 at cranked sections 48. As illustrated in, in particular, FIG. 4, the connection of the cranked sections 48 of the coupling rods 32 and 34 with respect to the coupling pins 64 at the coupling projections 50 extends eccentrically with respect to the pivot axis A. The connection of the coupling pins 64 of the second slats 24 at a first group of second slats 24 with the first coupling rod 32 extends through the axes F. Correspondingly, the connection of the second slats 24 of a second group of second slats 24 with the second coupling rod 34 extends through the axes E.

If the second control part 38 is pivoted about the second axis D, in the case of swivelling or pivoting by a specific amount the second slats 24 are brought into the closed position thereof, in which case the second slats 24 close the air channel through the housing 12 of the air vent 10. By virtue of the divided construction, i.e. the provision of second coupling rods 32 and 34, the second slats 24 are always brought by pressure into the closed position thereof. In addition, the cranked sections 48 of the coupling rods 32 and 34 produce a resilience. Pressure on the second slats 24 can then be maintained by way of the resilience when these are in their closed position. The sprung construction of the coupling rods 32 and 34 by way of the cranked sections 48 can serve, like the sprung construction of the gearwheel 28, for compensation for tolerances of the components of the air vent 10 as explained in the foregoing and in the introductory part of the description.

The first control part 36 has bearing pins 40 by way of which the first control part 36 is mounted in the mounting web 16 to be pivotable about the first axis C. The first control part 36 additionally has receptacles 58 surrounding coupling pins 60 at the first control slat 20 (see FIG. 8). In order to achieve compensation, in the case of swivelling or pivoting of the first control slat 20 and the second slat 24, in all settings of the respective slats and in order to achieve swivelling or pivoting of the first control slat 20 in opposite sense with respect to the first control part 36 the coupling pins 60 can be moved along the receptacles 58.

The second control part 38 has a first control section 56 engaging around the section 42 of the adjusting element 26. The section 42 engaged around by the first control section 56 is appropriately constructed in such a way that turning or rotating of the first adjusting element 26 cannot take place without displacement of the second control part 38. However, the first control section 56 is constructed so that even in the case of swivelling or pivoting of the first control part 36 a reliable control by swivelling or pivoting the first adjusting element 26 can still be performed.

Figure 3:
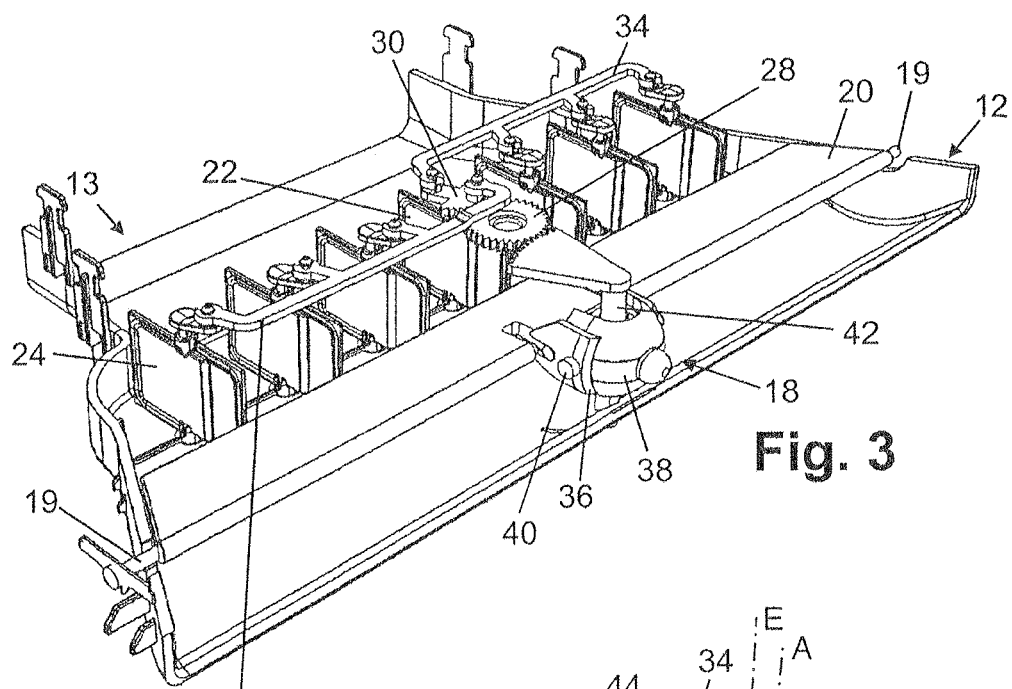
FIGS. 3 to 5 show perspective illustrations of components of the air vent of FIG. 1.
Figure 4:
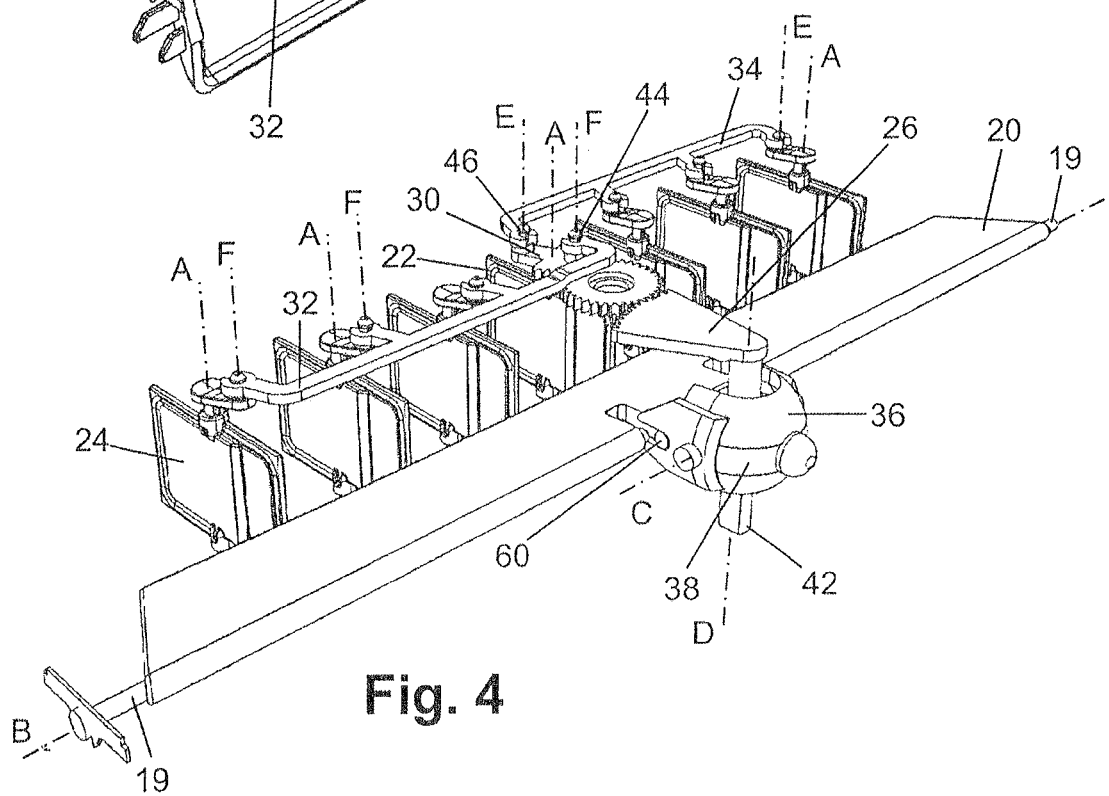

In that case, FIGS. 3 and 4 show schematic views of components of the air vent 10 respectively without and with parts of the housing 12.

Figure 5:
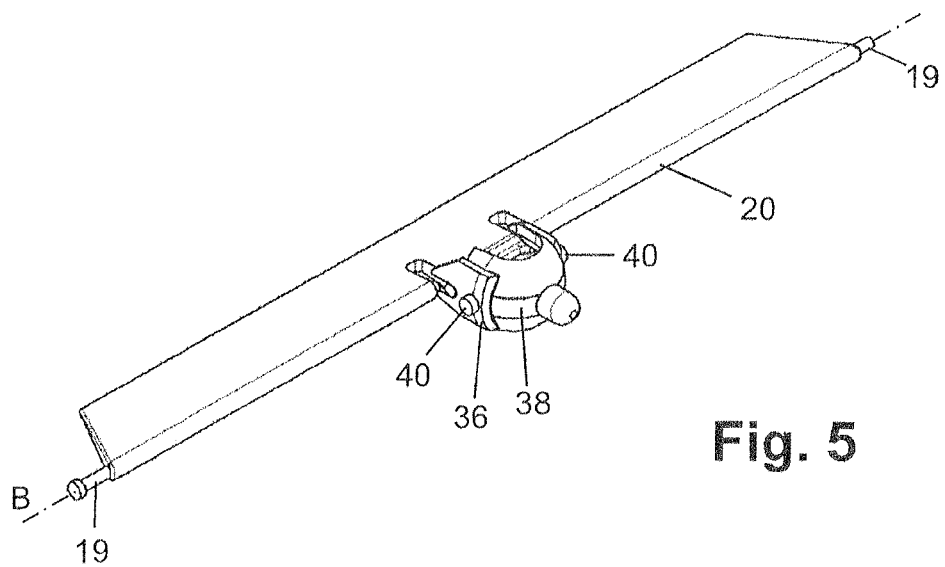
Figure 6:
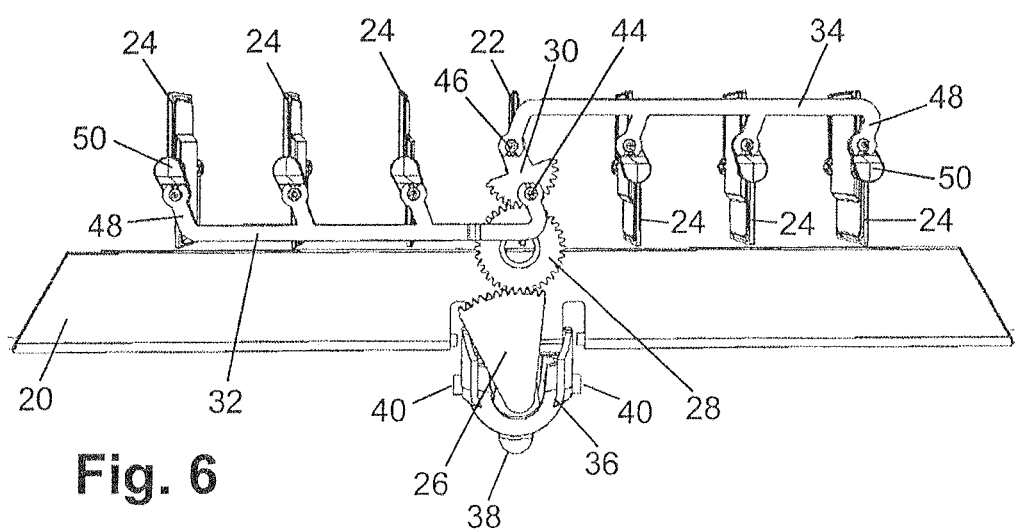

A perspective illustration of the first control slat 20 and of the control part 18 is shown in FIG. 5. FIG. 6 shows a schematic plan view of elements of the air vent 10 without the housing 12. In connection with FIG. 7 it is clear that in the case of swivelling or pivoting of the second control part 38 in the direction of the arrow 54 the second slats 24 as well as the second control slat 22 execute a corresponding swivelling or pivoting in the direction of the arrow 52. The gearwheel segment of the first adjusting element 26 as well as the gearwheel segment of the second adjusting element 30 and the construction of the first gearwheel 28 can be such that a step-up or step-down translation of the pivot movement of the second control part 38 is achieved. Step-up or step-down translation is to be provided with respect to the size of the air vent 10 as well as the desired, requisite operating forces.

In particular, the sprung construction of the first gearwheel 28 allows a relative movement or relative turning or rotating of the bearing of the gearwheel (see bearing 110) with respect to the toothed rim of the gearwheel (see toothed rim 108). The turning or rotating relative to one another can take place in both directions, as a result of which energy can be saved and the gearwheel is biased. Accordingly, the first gearwheel 28 can also be rotated further by comparison with a normal gearwheel when, for example, a conventional gearwheel without springing cannot be further rotated due to the constructional form of the air vent 10.

In FIG. 8 it is schematically illustrated how the coupling pins 60 of the first control slat 20 are received in the receptacles 58 of the first control part 36.

Figure 11:
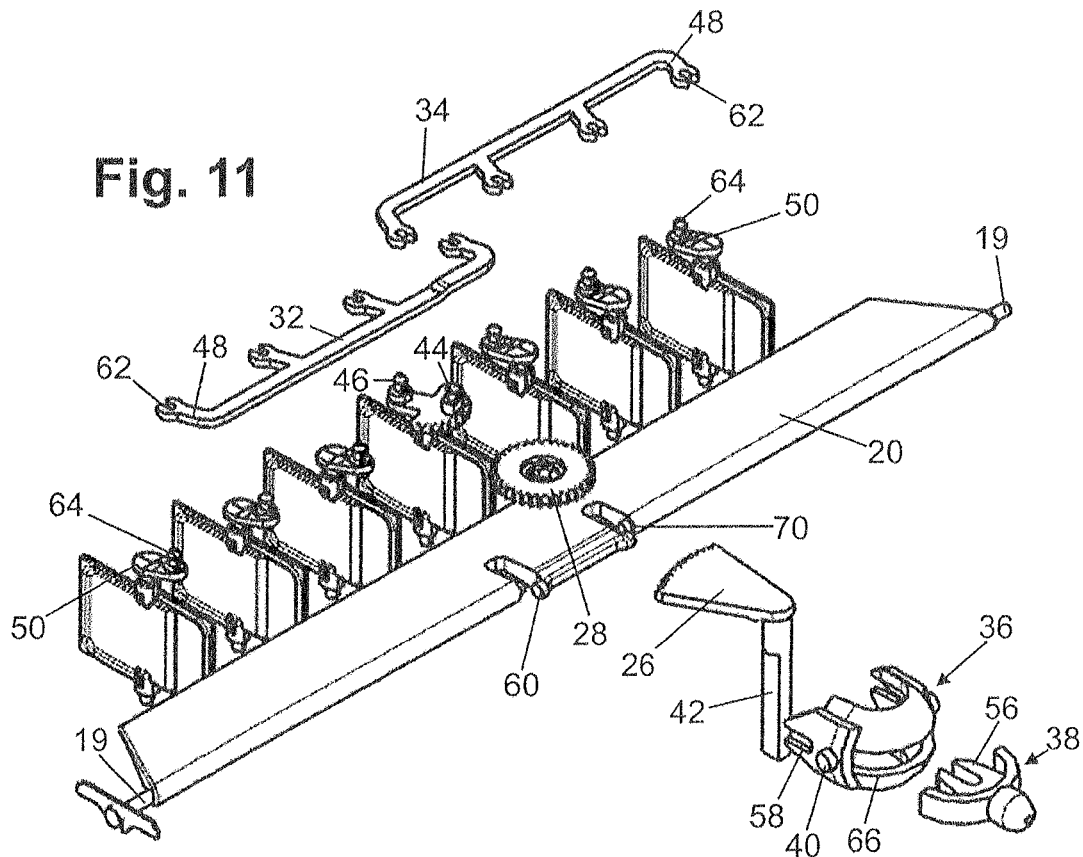
FIG. 11 shows an exploded illustration of components of the air vent of FIG. 1.

FIG. 11 shows the arrangement of the coupling pins 60 and the bearing pins 70 of the first control slat 20. Also illustrated is the opening 66 of the first control part 36, in which the second control part 38 is received. The bearing pins 70 extend along the longitudinal axis B and the coupling pins 60 extend parallel to the longitudinal axis B and parallel to the first axis C.

Figure 12:
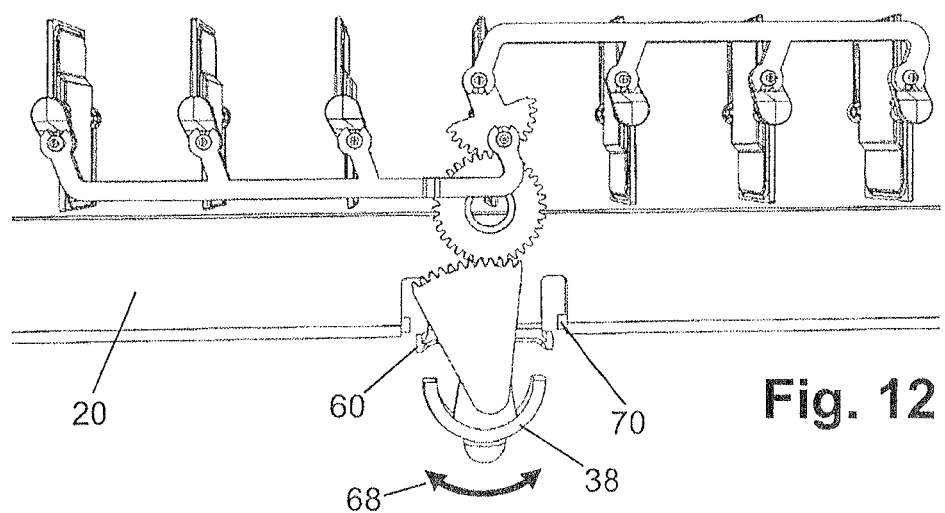
FIG. 12 shows a further schematic plan view of components of the air vent of FIG. 1.

If the second control part 38 is pivoted about the second axis D, as illustrated in FIG. 12 by the arrow 68, a turning or rotating of the first adjusting element 26, a turning or rotating of the first gearwheel 28 and thus a turning or rotating of the second adjusting element 30 take place. Correspondingly, the coupling rods 32 and 34 are moved by way of the eccentric mounting of the coupling elements 44 and 46, which apart from swivelling or pivoting of the second control slat 22 leads to swivelling or pivoting of the second slats 24. The construction described herein makes it possible for the second slats 24 to be brought by means of pressure into the closed position thereof in which the second slats 24 lie substantially in one plane. If the second slats 24 are brought by means of pressure into the closed position thereof then a better sealing in the case of closure of the air channel is achieved. Consequently, no or only very small leakage air flows arise when the air vent 10 is closed. Residual leakage air flows can be precluded by additional seals at the second slats 24 and the second control slat 22 as well as at the inner sides of the housing 12 in the contact regions for the second slats 24 and the second control slat 22. In particular, a sealed closure can also be achieved when the second slats 24 and the second control slat 22 bear not against one another at edges, but at contact surfaces.

The construction of the second slats 24 and the second control slat 22 as well as the eccentric mounting of the coupling elements 44 and 46 can also be inferred from the perspective illustration of FIG. 13. In addition, the construction of the cranked sections 48 of the coupling rods 32 and 34 can be inferred from this illustration. In that case, the cranking in the sections 48 is selected in such a way as to assist application of pressure for bringing into the closed position.

FIG. 14 shows a view from behind of components of the air vent 10. FIG. 14 shows the mounting web 16 from behind and the mounting of the first control slat 20 by way of the bearing pins 70.

Figure 15:
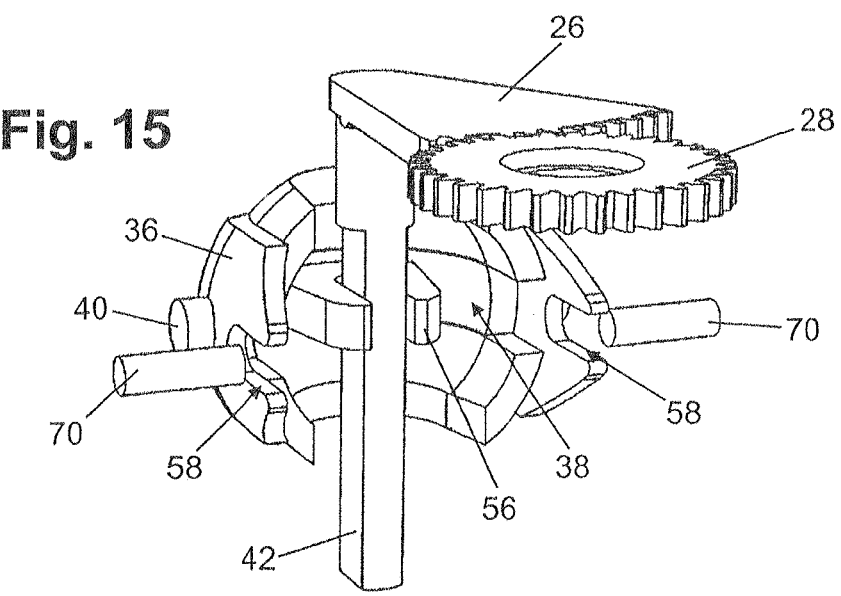

An illustration to enlarged scale of the first control part 36, the second control part 38, the first adjusting element 26 and the first gearwheel 28 is shown in FIG. 15. The gearwheel 28 is of sprung construction differing from that illustrated in FIGS. 1 to 16. A springing can also be achieved by a specific mounting. For example, a conventional gearwheel can be mounted on the housing 12 by way of a sprung mounting device.

Figure 16:
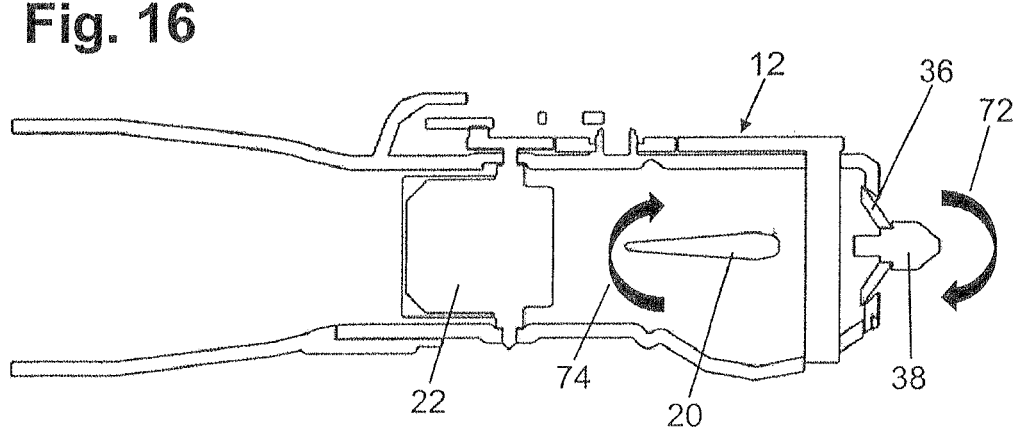
FIG. 16 shows a schematic sectional view of the air vent of FIG. 1.
Figure 17:
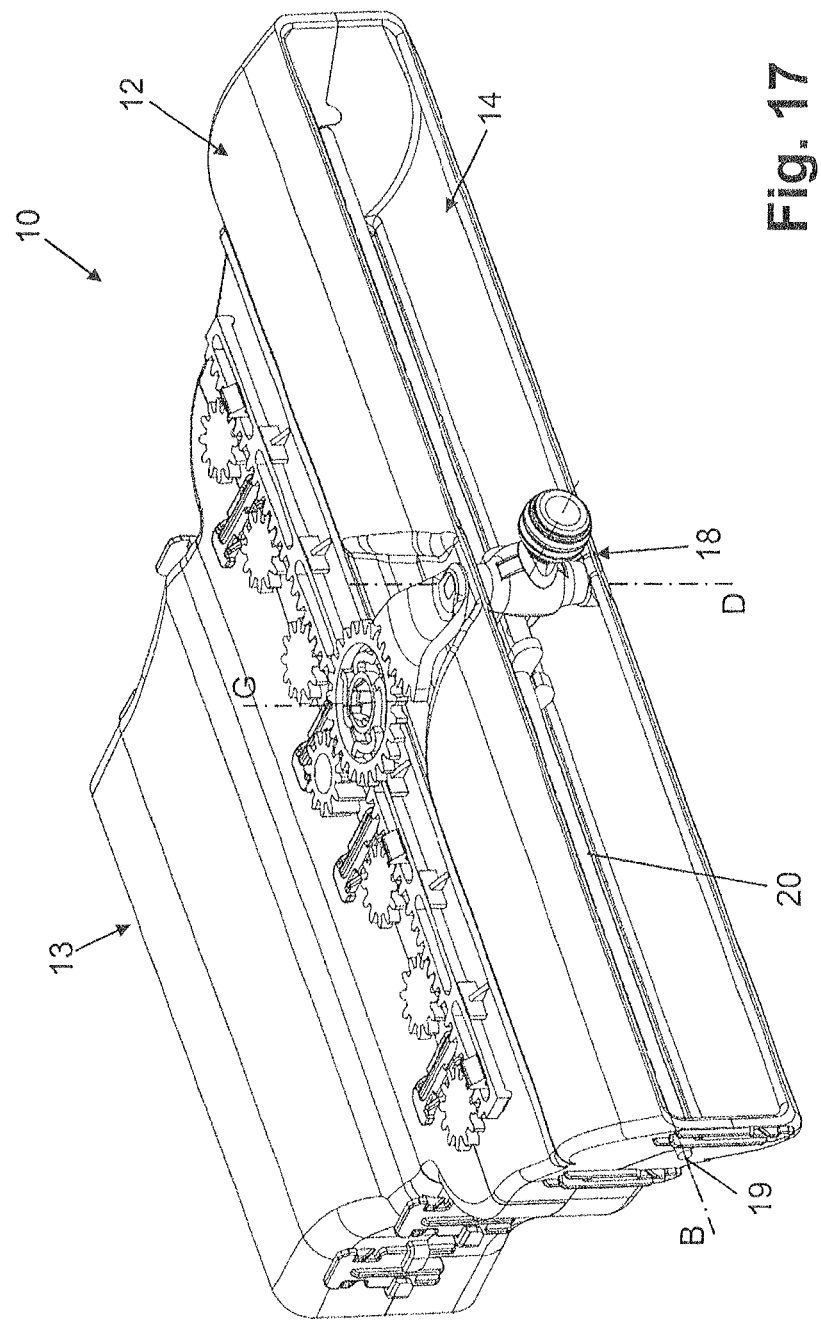
FIG. 17 shows a perspective illustration of an air vent of a second form of embodiment.
Figure 18:
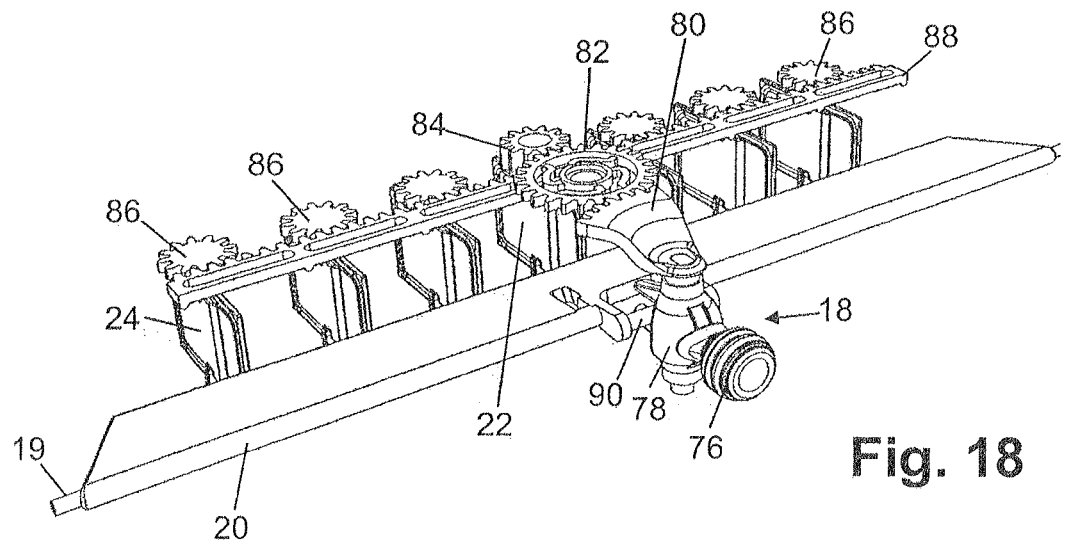
FIG. 18 shows a perspective illustration of components of the air vent of FIG. 17.
Figure 19:
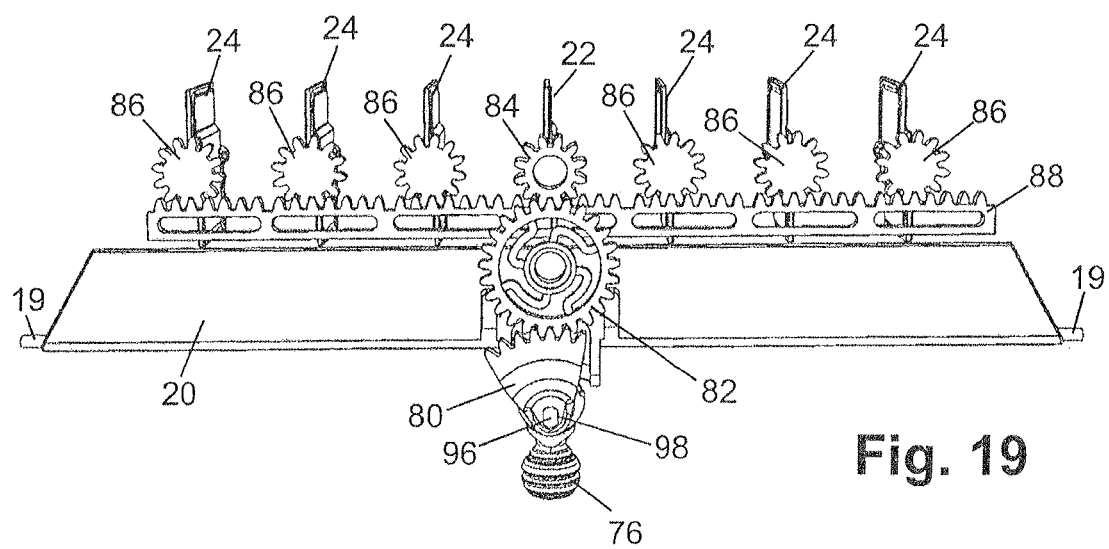
FIG. 19 shows a schematic plan view of components of the air vent of FIG. 17.
Figure 20:
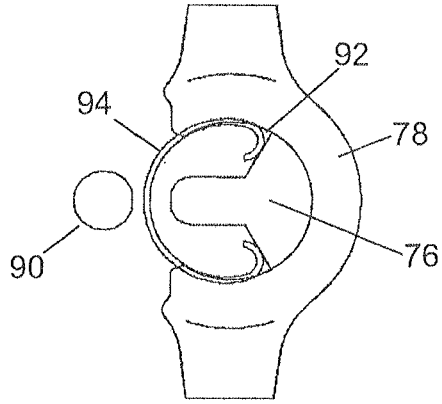
FIGS. 20 to 23 show different components of the air vent of FIG. 17.

FIG. 16 shows a section through an air vent 10. It is illustrated therein that in the event of swivelling or pivoting of the first control part 36, for example by way of the second control part 38, downwardly in the direction of the arrow 72 a swivelling or pivoting of the first control slat 20 in opposite sense in the direction of the arrow 74 takes place.

Second Form of Embodiment

A second form of embodiment of an air vent 10 is shown in FIGS. 17 to 30 and described in the following with reference to FIGS. 17 to 30.

The air vent 10 of the second form of embodiment differs from the air vent 10 of the first form of embodiment in that no mounting web 16 is provided, but the second control part 78 serves as mounting. The second control part 78 is supported between an upper housing part and a lower housing part so that even in the case of increased control force applied to, for example, the first control part 76 no warping of the first control slat 20 occurs. The second control part 78 is mounted in the housing 12 to be rotatable about the second axis D so that analogously to the first described form of embodiment a turning or rotating of the second control part 78 causes swivelling or pivoting of the second slats 24 and the second control slat 22. If the first control part 76 is pivoted downwardly or upwardly, swivelling or pivoting of the first control slat 20 takes place in opposite sense. The first control slat 20 in that case has a control shaft 90 which is engaged around by a second control section 102 of the first control part 76.

Figure 23:
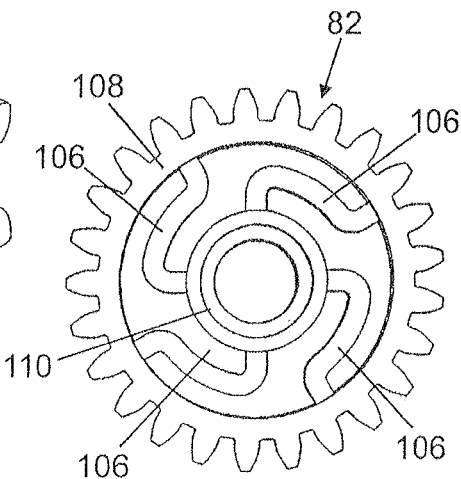

The second control part 78 has a mounting by way of which the second control part 78 is mounted in openings in the housing 12. However, a connecting pin 96 of the second control part 78 projects upwardly out of the housing 12 and is received in a corresponding receptacle 98 of a first adjusting element 80. This means that swivelling or pivoting of the second control part 78 leads to corresponding swivelling or pivoting of the first adjusting element 80. Analogously to the first-described form of embodiment, the first adjusting element 80 is coupled with a second adjusting element by way of a first gearwheel 82 of sprung construction. As illustrated in FIG. 23, the first gearwheel 82 has a bearing 110 by way of which it is mounted on the housing 12 of the air vent 10 to be rotatable about the axis G. In addition, the gearwheel 82 has a toothed rim 108. The bearing 110 is connected with the toothed rim 108 by way of arms 106, wherein the construction of the arms 106 makes a springing possible. The springing enables, for example in the case of over-rotation or also in the case of a different use, storage of energy and in a closed position of the slats 24 transmission of the stored energy by way of a rack 88 and third gearwheels 86 as well as a gearwheel 84 to the second slats 24 and the second control slat 22 in order to maintain the position thereof and/or provide compensation for tolerances. As a result, sealed closure of an air channel of the air vent 10 can be maintained even after application of a control force.

In the second form of embodiment the second adjusting element is formed by the gearwheel 84, which has a greater height than the gearwheel 82. If the gearwheel 82 is rotated, then in analogous manner turning or rotation of the gearwheel 84 takes place, which is rotatable together with the second control slat 22 about the pivot axis A. In addition, through the turning or rotating of the gearwheel 84, the rack 88 is displaced in corresponding manner. The teeth of the rack 88 are disposed in engagement with the teeth of the third gearwheels 86 and in the case of displacement of the rack 88 produce turning or rotating of the third gearwheels 86, which are fixedly connected with the second slats 24. In that case, a swivelling or pivoting of all second slats 24 and the second control slat 22 in common is achieved by way of the turning or rotation of the first gearwheel 82.

The rack 88 is similarly of resilient construction, for which purpose openings 114 are provided. The longitudinal side without teeth can then move relative to the longitudinal side of the rack 88 with the teeth. In that case it is possible to store energy which, for example, in a closed position of the air vent 10 applies further pressure to the slats 24 by way of the coupling with the third gearwheels 86 and/or serves to provide compensation for tolerances. Thus, in further embodiments the gearwheel 84 and the third gearwheels 86 can also be of sprung construction.

The sprung construction of the gearwheel 82 and the rack 88 serves for, in particular, compensation for tolerances in the components of the air vent 10, as explained in the introduction to the description and for the first form of embodiment.

Figure 24:
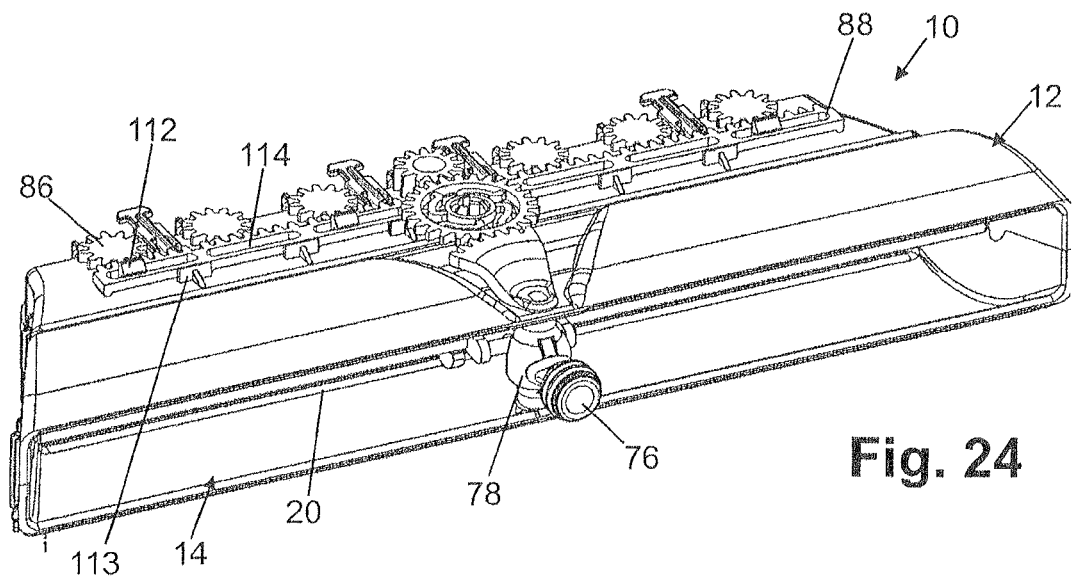
FIG. 24 shows a further perspective illustration of the air vent of FIG. 17.
Figure 25:
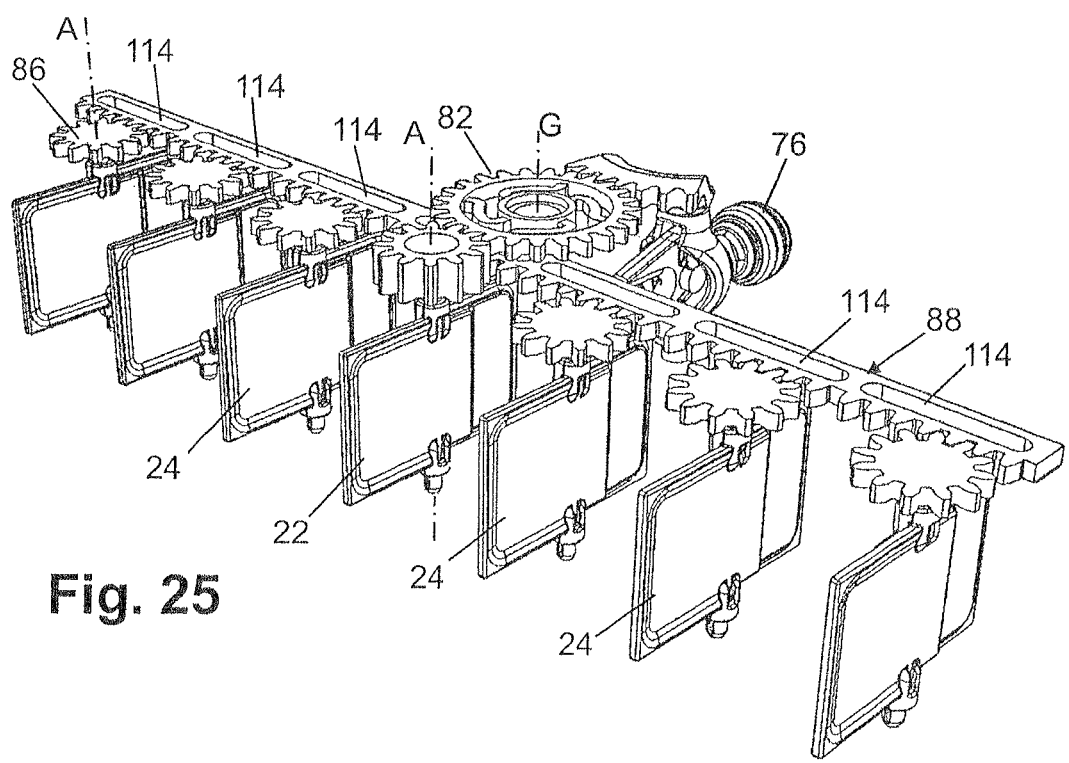
FIG. 25 shows yet another perspective illustration of components of the air vent of FIG. 17.

As illustrated in FIG. 24, guide elements 112 which hold the rack 88 in position are also mounted in the openings 114. The guide elements 112 are so constructed that they permit a certain degree of compensatory movement orthogonally to the main displacement direction. Guide elements 113 prevent the rack 88 from being moved away from the gearwheels 86. The guide elements 113 in that case ensure that the teeth of the rack 88 always mesh with the teeth of the gearwheels 86 and 84.

Figure 22:
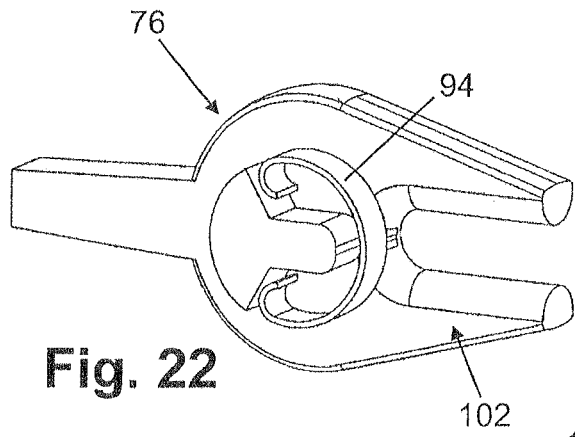

In the second form of embodiment the first control slat 20 is mounted in the housing 12 only by way of the bearing pins 19. The first control slat 20 has the control shaft 90 in a central region. As described in the preceding, the control shaft 90 is engaged around by the second control section 102. The construction of the control section 102 is illustrated in FIG. 22. The front knob at the control element 18 is plugged onto the lefthand section of the first control part 76 and turning or rotation of the control knob with respect to the first control part 76 is prevented by the rectangular cross-section. The control knob can be fixedly connected with the control part 76 by means of, for example, the action of heat or by adhesives and can thereby be part of the control part 76. The control part 76 has a lateral shaped portion at which a spring 94, preferably a metal spring, is arranged. The spring 94 is arranged in a corresponding receptacle 92 in the second control part 78 (see FIG. 20) and the curved yoke of the spring 94 is supported relative to the sections of the shaped portion of the first control part 76. When the first control part 76 is received in the second control part 78, in which case the second control part 78 has an additional bearing 100 for the first control part 76, then swivelling or pivoting of the first control 76 about the first axis C can take place only if the force applied by the spring 94 is overcome. The spring 94 in that case serves, in particular, to provide compensation for tolerances and to maintain uniform control forces for swivelling or pivoting the first control slat 20.

Figure 21:
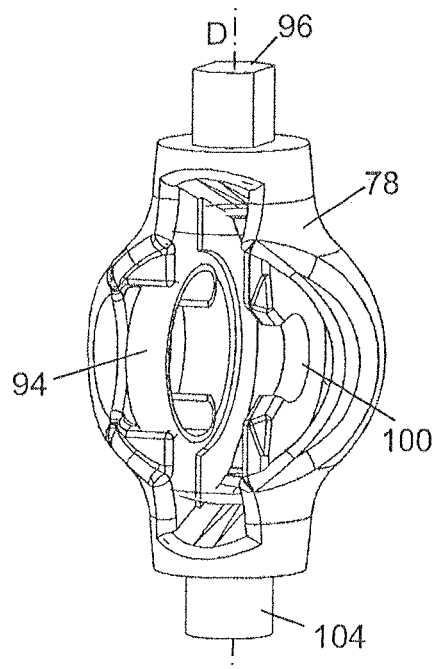

In addition, an illustration to enlarged scale of the second control part 78 together with the spring 94 received in the receptacle 92 is illustrated in FIG. 21. The second control part 78 is mounted by way of the bearing pins 104 in a corresponding opening in a lower housing half of the housing 12 of the air vent 10 to be rotatable about the second axis D. The upper connecting pin 96 serves for connection with the first adjusting element 80. A rotatable mounting of the second control part 78 in an upper housing half of the housing 12 therefore takes place below the connecting pin 96 or by way of a lower section of the connecting pin 96.

Figure 26:
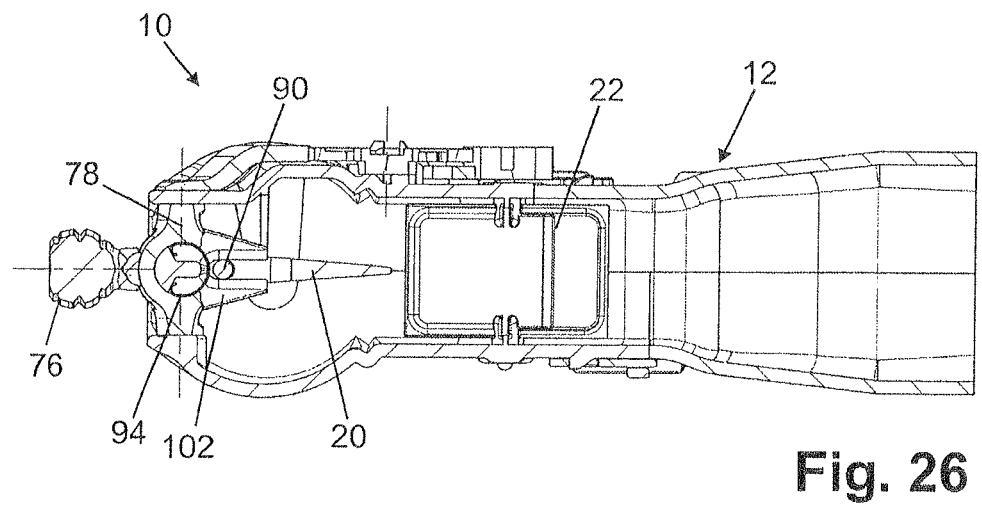
FIGS. 26 and 27 show schematic sectional illustrations of the air vent of FIG. 17.
Figure 27:
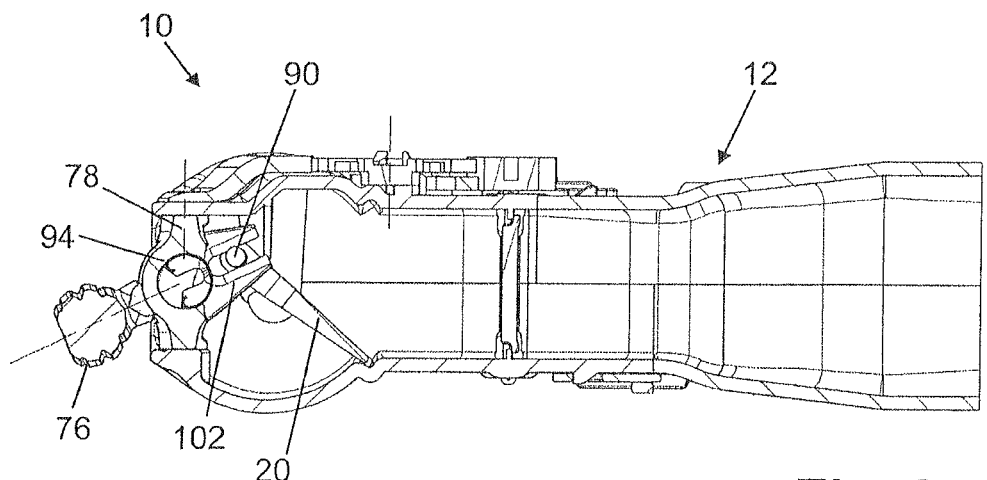

FIGS. 26 and 27 show different states of the air vent 10. In FIG. 26, the air vent 10 is disposed in a neutral setting, in which the first control slat 20 and the second slats 24 as well as the second control slat 22 are not pivoted.

By contrast, FIG. 27 shows an extreme setting in which the first control slat 20 is deflected to a maximum extent and the second slats 24 as well as the second control slat 22 are disposed in the end or closed setting thereof. In order to pivot the first control slat 20 in correspondence with the illustration in FIG. 27, the first control part 76 has to be pressed downwardly. In that case, the bearing shaft 90 can slide within the receptacle of the second control slat 102. As can be further inferred from FIGS. 26 and 27, swivelling or pivoting of the first control part 76 takes place against the force of the spring 94, which is supported within the receptacle 92 and presses against the projecting section of the first control part 76.

Figure 28:
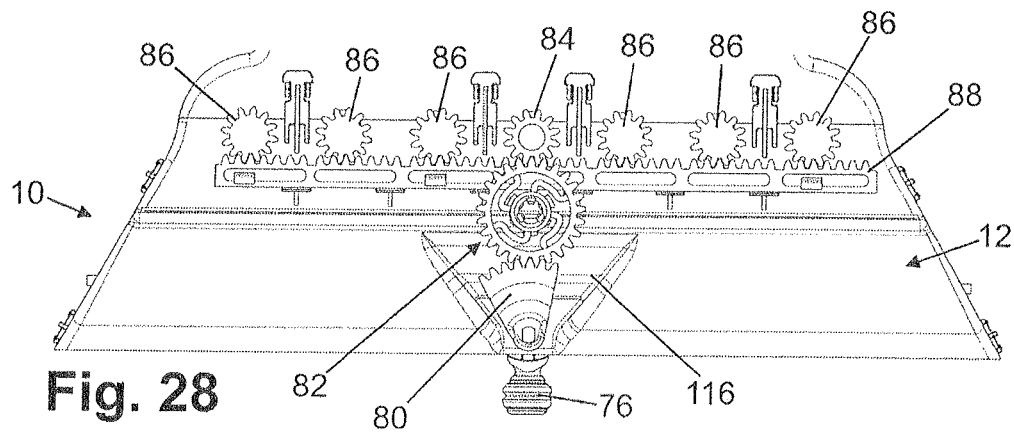
FIGS. 28 to 30 show different schematic plan views of the air vent of FIG. 17.
Figure 29:
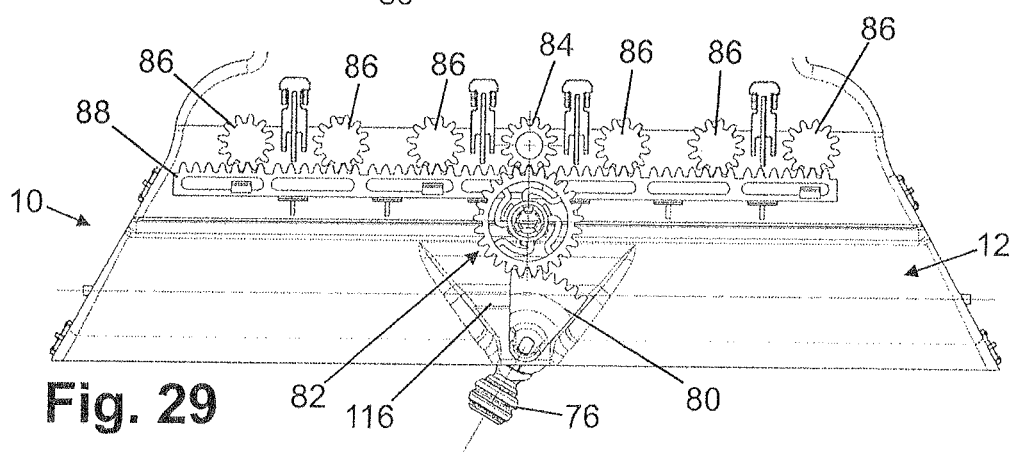
Figure 30:
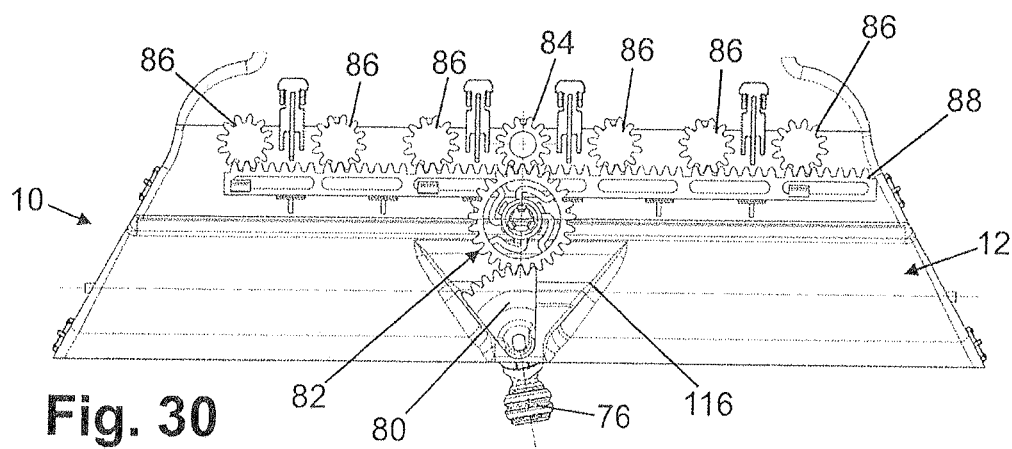

FIGS. 28 to 30 show views with respect to swivelling or pivoting of the second control slat 22 and the second slats 24. FIG. 28 shows essentially a neutral setting in which the second slats 24 are hardly pivoted. Moreover, it is illustrated in FIGS. 28 to 30 that a projection 116 which limits pivotation travel of the first adjusting element 80 is provided at the upper side of the housing 12. The first adjusting element 80 is thereby prevented from being rotated to an excessive extent.

In FIG. 29 the first control part 76 is pivoted to the left to a maximum extent, wherein the second slats 24 and the second control slat 22 interrupt the air channel through the housing 12 of the air vent 10 (see illustration of FIG. 27).

In FIG. 30, the first control element 76 is pivoted to the right.

In the case of swivelling or pivoting of the first control element 76 about the second axis D, transmission of the rotational movement by way of the teeth of the toothed section of the first control element 80 to the sprung gearwheel 82 takes place. The sprung gearwheel transmits the rotational movement to the gearwheel 84, which produces not only swivelling or pivoting of the second control slat 22, but also transmission of the rotational movement to the rack 88. Displacement of the rack 88 produces turning or rotating or rotation of the second slats 24 by way of the direct coupling thereof with the third gearwheels 86. As a result, a movement transmission with small installation space is provided in simple manner, which in addition provides the possibility of energy storage, the possibility of step-up or step-down translation, prevention of turbulence in the exiting air and compensation for tolerances.

As shown in the foregoing for the exemplifying constructions of the air vent (first form of embodiment and second form of embodiment), the important components of the kinematic system for swivelling or pivoting of the second slat 24 and the second control slat 70, specifically at least the first adjusting element 26, 80, the first gearwheel 28, 82, the second adjusting element 30, the gearwheel 84 and the coupling rods 32 and 34 as well as the rack 88 are disposed outside the housing 12. As a result, there is no influencing and deflection of or creation of turbulence in the air, which flows out by way of the air outlet region 14, in the air channel by way of these components. Moreover, the second control slat 22 does not have to have a cut-out or other constructional features which cause additional turbulence in the air or in a closed setting of the slats permit a leakage air flow due to a cut-out. The second control slat 22 can be constructed within the air channel just like the remaining second slats 24. Moreover, the first control slat 20 does not have any mounts, guides or other means which would similarly increase the cross-section of the control slat 20 or result in shapings or arrangements at the first control slat 20. An improved closing of the air channel by way of the second slats 24 and the second control slat 22 is thereby provided, in which case in addition no kinematic system components are arranged within the air channel.

Through a step-shaped construction of the second slats 24 and the second control slat 22 these not only bear against one another along the contact edges, but also can advantageously bear against one another over an area. As a result, the throughflow of leakage air when the air channel is closed is further prevented. Moreover, in further forms of embodiment the contact edges or also the contact areas can be provided with sealing means. Suitable for that purpose are, for example, foams or sealing rings of rubber arranged to encircle the slats. In addition, the housing 12 can have encircling sealing means which in the case of a closed setting of the second slats 24 and the second control slat 22 seal off the housing 12 relative to the second slats 24 and the second control slat 22.

The sprung configuration of components of the air vent 10 makes it possible to provide compensation for differences in size of the components. Accordingly, it is possible to dispense with close tolerance limits, which significantly reduces the costs of the air vents 10. In that case, the number of parts not to specification is also significantly reduced.

REFERENCE NUMERAL LIST 10 air vent
12 housing
13 connection
14 air outlet region
16 mounting web
18 control element
19 bearing pin
20 first control slat
22 second control slat
24 second slat
26 first adjusting element
28 first gearwheel
30 second adjusting element
32 first coupling rod
34 second coupling rod
36 first control part
38 second control part
40 bearing pin
42 section
44 coupling element
46 coupling element
48 section
50 coupling projection
52 arrow
54 arrow
6 first control section
58 receptacle
60 coupling pin
62 opening
64 coupling pin
66 opening
68 arrow
70 bearing pin
72 arrow
74 arrow
76 first control part
78 second control part
80 first adjusting element
82 gearwheel
84 gearwheel
86 third gearwheel
88 rack
90 control shaft
92 receptacle
94 spring
96 connecting pin
98 receptacle
100 bearing
102 second control section
104 bearing pin
106 arm
108 toothed rim
110 bearing
112 guide element
113 guide element
114 opening
116 projection
A pivot axis
B longitudinal axis
C first axis D second axis
E axis
F axis
G axis

The invention claimed is:

1. An air vent with a device for controlling an air flow, comprising at least one first control slat pivotably mounted in a housing and second slats extending orthogonally to the first control slat and pivotably mounted in the housing, wherein a direction of the air flow exiting the housing is settable by way of the first control slat and the second slats and an amount of outflowing air is settable by way of the second slats, and a control element arranged in an air outlet region of the housing, wherein
- the control element is mounted to be pivotable about an axis extending parallel to the pivot axis of the second slat and is coupled with a first adjusting element and with the first control slat,
- the first adjusting element comprises a toothed segment disposed in engagement with a first gearwheel rotatably mounted on the housing,
- the first gearwheel is disposed in engagement with a second adjusting element arranged at a second control slat of the second slats,
- the second control slat is coupled by way of at least one coupling rod with the other second slats,
- the first gearwheel has a sprung configuration,
- wherein the control element comprises a first control part and a second control part, wherein the first control part is mounted on a mounting web to be pivotable about a first axis extending parallel to the longitudinal axis of the first control slat and the second control part is mounted in the first control part to be rotatable about a second axis extending orthogonally to the first axis,
- wherein the first adjusting element has a section, which extends orthogonally to the toothed segment and along the second axis and about which the first adjusting element is rotatably mounted in the housing, the section being surrounded by a first control section of the second control part, and
- wherein the second adjusting element has at least one toothed segment section and two opposite coupling elements arranged eccentrically with respect to the pivot axis of the second control slat, wherein the coupling elements are each connected with an additional coupling rod and the additional coupling rods are each connected with a respective group of second slats.

2. The air vent according to claim 1, wherein the coupling rods have cranked sections by way of which the coupling rods are connected with the second slats.

3. The air vent according to claim 1, wherein the control element has a first control part and a second control part, wherein the first control part is mounted in the second control part to be pivotable about a first axis extending parallel to the longitudinal axis of the first control slat and the second control part is mounted on the housing to be pivotable about a second axis extending orthogonally to the first axis.

4. The air vent according to claim 3, wherein the first control part is pivotably mounted by way of a spring in a receptacle in the second control part.

5. The air vent according to claim 4, wherein the first adjusting element is connected with the second control part and the first control part has a control section coupled with the first control slat.

6. The air vent according to claim 4, wherein the second adjusting element is a second gearwheel, which is connected with the second control slat and disposed in engagement with the first gearwheel, wherein the second slats are each connected with a third gearwheel, the axis of rotation of which is the pivot axis of the second slats, and wherein the third gearwheels are coupled with the second gearwheel by way of a rack.

7. The air vent according to claim 6, wherein the rack is a sprung rack and is mounted on the housing by way of guide elements.

8. The air vent according to claim 3, wherein the first adjusting element is connected with the second control part and the first control part has a control section coupled with the first control slat.

9. The air vent according to claim 8, wherein the second adjusting element is a second gearwheel, which is connected with the second control slat and disposed in engagement with the first gearwheel, wherein the second slats are each connected with a third gearwheel, the axis of rotation of which is the pivot axis of the second slats, and wherein the third gearwheels are coupled with the second gearwheel by way of a rack.

10. The air vent according to claim 9, wherein the rack is a sprung rack and is mounted on the housing by way of guide elements.

11. The air vent according to claim 3, wherein the second adjusting element is a second gearwheel, which is connected with the second control slat and disposed in engagement with the first gearwheel, wherein the second slats are each connected with a third gearwheel, the axis of rotation of which is the pivot axis of the second slats, and wherein the third gearwheels are coupled with the second gearwheel by way of a rack.

12. The air vent according to claim 11, wherein the rack is a sprung rack and is mounted on the housing by way of guide elements.

13. The air vent according to claim 1, wherein
- the second slats have a cross-section with at least one step,
- the second slats have a seal at least at the outer edges thereof extending parallel to the pivot axis and/or
- the housing has a sealing arrangement around inner side walls of the housing extending parallel to the pivot axis of the second slats.

14. An air vent with a device for controlling an air flow, comprising at least one first control slat pivotably mounted in a housing and second slats extending orthogonally to the first control slat and pivotably mounted in the housing, wherein a direction of the air flow exiting the housing is settable by way of the first control slat and the second slats and an amount of outflowing air is settable by way of the second slats, and a control element arranged in an air outlet region of the housing, wherein
- the control element is mounted to be pivotable about an axis extending parallel to the pivot axis of the second slat and is coupled with a first adjusting element and with the first control slat,
- the first adjusting element comprises a toothed segment disposed in engagement with a first gearwheel rotatably mounted on the housing,
- the first gearwheel is disposed in engagement with a second adjusting element arranged at a second control slat of the second slats,
- the second control slat is coupled by way of at least one coupling rod with the other second slats,
- the first gearwheel has a sprung configuration,
- wherein the control element has a first control part and a second control part, wherein the first control part is mounted in the second control part to be pivotable about a first axis extending parallel to the longitudinal axis of the first control slat and the second control part is mounted on the housing to be pivotable about a second axis extending orthogonally to the first axis, and wherein the first control part is pivotably mounted by way of a spring in a receptacle in the second control part.

15. The air vent according to claim 14, wherein the first adjusting element is connected with the second control part and the first control part has a control section coupled with the first control slat.

16. The air vent according to claim 14, wherein the second adjusting element is a second gearwheel, which is connected with the second control slat and disposed in engagement with the first gearwheel, wherein the second slats are each connected with a third gearwheel, the axis of rotation of which is the pivot axis of the second slats, and wherein the third gearwheels are coupled with the second gearwheel by way of a rack.

17. The air vent according to claim 16, wherein the rack is a sprung rack and is mounted on the housing by way of guide elements.

18. The air vent according to claim 14, wherein
the second slats have a cross-section with at least one step,
the second slats have a seal at least at the outer edges thereof extending parallel to the pivot axis and/or
the housing has a sealing arrangement around inner side walls of the housing extending parallel to the pivot axis of the second slats.

19. The air vent according to claim 14, wherein the first control part is mounted on a mounting web to be pivotable about the first axis extending parallel to the longitudinal axis of the first control slat and the second control part is mounted in the first control part to be rotatable about the second axis extending orthogonally to the first axis.

20. The air vent according to claim 19, wherein the first adjusting element has a section, which extends orthogonally to the toothed segment and along the second axis and about which the first adjusting element is rotatably mounted in the housing, the section being surrounded by a first control section of the second control part.

* * * * *

UNITED STATES PATENT AND TRADEMARK OFFICE
CERTIFICATE OF CORRECTION

PATENT NO.         : 10,981,435 B2
APPLICATION NO.    : 15/566187
DATED              : April 20, 2021
INVENTOR(S)        : Gareis et al.

Page 1 of 1

It is certified that error appears in the above-identified patent and that said Letters Patent is hereby corrected as shown below:

(30) Foreign Application Priority Data Should Read:
--October 29, 2015 (DE) .....................10 2015 118 548.2
May 28, 2015 (DE) .....................10 2015 108 434.1--

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*